(12) United States Patent
Sigmon, Jr. et al.

(10) Patent No.: US 12,544,091 B2
(45) Date of Patent: Feb. 10, 2026

(54) ENDOSCOPIC RESECTION CAP WITH BUILT-IN OSCILLATING DISSECTOR

(71) Applicant: Cook Medical Technologies LLC, Bloomington, IN (US)

(72) Inventors: John C. Sigmon, Jr., Winston-Salem, NC (US); Shaun D. Gittard, Winston-Salem, NC (US); Christopher A. Carruthers, Winston-Salem, NC (US); Liam Breen, Limerick (IE); Vihar C. Surti, Winston-Salem, NC (US)

(73) Assignee: COOK MEDICAL TECHNOLOGIES LLC, Bloomington, IN (US)

(*) Notice: Subject to any disclaimer, the term of this patent is extended or adjusted under 35 U.S.C. 154(b) by 942 days.

(21) Appl. No.: 16/922,672

(22) Filed: Jul. 7, 2020

(65) Prior Publication Data

US 2021/0007766 A1 Jan. 14, 2021

Related U.S. Application Data

(60) Provisional application No. 62/871,450, filed on Jul. 8, 2019.

(51) Int. Cl.
*A61B 17/32* (2006.01)
*A61B 1/00* (2006.01)
(Continued)

(52) U.S. Cl.
CPC .... *A61B 17/32002* (2013.01); *A61B 1/00101* (2013.01); *A61B 1/313* (2013.01);
(Continued)

(58) Field of Classification Search
CPC .... A61B 17/32002; A61B 2017/00296; A61B 2017/00323; A61B 17/320758;
(Continued)

(56) References Cited

U.S. PATENT DOCUMENTS

| 4,490,885 A | 1/1985 | Iskiw et al. |
| 4,990,134 A | 2/1991 | Auth |

(Continued)

FOREIGN PATENT DOCUMENTS

| CN | 108670358 A | 10/2018 |
| EP | 3 597 126 A1 | 4/2013 |

(Continued)

OTHER PUBLICATIONS

International Search Report and Written Opinion for PCT/US2020/041021, dated Nov. 19, 2020, 12 pp.

(Continued)

*Primary Examiner* — Joseph A Stoklosa
*Assistant Examiner* — Annie L Shoulders
(74) *Attorney, Agent, or Firm* — Vivacqua Crane, PLLC

(57) ABSTRACT

A medical device for facilitating a minimally invasive surgical procedure may include a housing and an arm. The housing may be configured for engagement around an outer circumferential surface of an endoscope and may include a first cavity. The arm may include at least one cutting surface and may be movably received within the first cavity. The arm may be configured to perform a first predetermined movement along at least a first plane at a predetermined frequency.

19 Claims, 18 Drawing Sheets

(51) Int. Cl.
*A61B 1/313* (2006.01)
*A61B 17/00* (2006.01)

(52) U.S. Cl.
CPC .............. *A61B 2017/00296* (2013.01); *A61B 2017/00323* (2013.01)

(58) Field of Classification Search
CPC ...... A61B 17/320725; A61B 17/32075; A61B 17/320783
See application file for complete search history.

(56) References Cited

U.S. PATENT DOCUMENTS

| | | | |
|---|---|---|---|
| 6,524,234 | B2 | 2/2003 | Ouchi |
| 7,998,066 | B2 | 8/2011 | Carter |
| 8,357,082 | B2 | 1/2013 | Okada |
| 8,801,604 | B2 | 8/2014 | Hoshino |
| 9,232,949 | B2 | 1/2016 | Carusillo et al. |
| 9,364,253 | B1 * | 6/2016 | Polo .................. A61B 17/32002 |
| 9,538,995 | B2 | 1/2017 | Crenshaw et al. |
| 9,572,585 | B2 | 2/2017 | Carusillo |
| 9,592,069 | B2 * | 3/2017 | Moody .......... A61B 17/320016 |
| 10,220,539 | B2 | 3/2019 | Mann |
| 10,376,278 | B2 | 8/2019 | Fojik et al. |
| 10,383,651 | B2 | 8/2019 | Pell et al. |
| 10,639,056 | B2 * | 5/2020 | Pell ................ A61B 17/320016 |
| 2007/0167966 | A1 * | 7/2007 | Simpson ............ A61B 17/3211 |
| | | | 606/180 |
| 2017/0035449 | A1 | 2/2017 | Pell et al. |
| 2017/0042562 | A1 * | 2/2017 | Moody ............ A61B 17/32002 |
| 2017/0112361 | A1 * | 4/2017 | Surti ................. A61B 1/00101 |
| 2017/0112523 | A1 * | 4/2017 | Jagelski ............. A61B 18/1492 |
| 2017/0167966 | A1 | 6/2017 | Appleyard et al. |
| 2017/0281302 | A1 | 10/2017 | Pell et al. |
| 2019/0021745 | A1 * | 1/2019 | Shiels .................. A61B 17/142 |
| 2019/0117252 | A1 | 4/2019 | Pell et al. |
| 2019/0125366 | A1 | 5/2019 | Sun et al. |
| 2019/0175799 | A1 | 6/2019 | Hsu et al. |
| 2019/0247156 | A1 | 8/2019 | Wen |
| 2019/0290289 | A1 * | 9/2019 | Schmuckli ............ B27B 19/006 |
| 2019/0365405 | A1 | 12/2019 | Pell et al. |
| 2020/0000459 | A1 * | 1/2020 | Mizutani ............. A61B 1/00087 |
| 2020/0001494 | A1 | 1/2020 | Gisler et al. |
| 2021/0322004 | A1 * | 10/2021 | Khanicheh ......... A61B 1/00137 |
| 2023/0181183 | A1 * | 6/2023 | Mitelberg .......... A61B 17/0625 |
| | | | 606/147 |

FOREIGN PATENT DOCUMENTS

| | | |
|---|---|---|
| JP | 2016-534799 A | 11/2016 |
| JP | 2017511223 A | 4/2017 |
| JP | 2017213369 A | 12/2017 |
| JP | 2018-535738 A | 12/2018 |
| JP | 2019-213922 | 12/2019 |
| JP | 7422212 B | 9/2022 |

OTHER PUBLICATIONS

Japanese Office Action regarding JP 2022-500993 dated Jan. 24, 2023.
Australian Office Action regarding 2023222512 dated Jun. 20, 2024, 3 pages.
Japanese Patent Office. Notice of Grounds of Rejection for JP Application No. 2023-187811 and English translation, mailed Oct. 29, 2024, pp. 1-5.
The State Intellectual Property Office of People's Republic of China. First Office Action for CN Application No. 202080049470.0 and English translation, mailed Nov. 5, 2024, pp. 1-13.

* cited by examiner

ENDOSCOPIC RESECTION CAP WITH BUILT-IN OSCILLATING DISSECTOR

CROSS-REFERENCE TO RELATED APPLICATIONS

This application is a non-provisional application which claims priority to U.S. provisional application Ser. No. 62/871,450; filed Jul. 8, 2019, which is incorporated by reference herein in its entirety.

TECHNICAL FIELD

Endoscopic Submucosal Dissection (ESD) is a minimally invasive method for removing cancerous tissue or other lesions along the gastrointestinal (GI) tract. ESD can be used when the cancerous tissue or other target tissue within the first two inward-facing layers of the GI wall: the mucosal and submucosal layers. The GI tract contains four layers: the innermost layer is the mucosa (which may include epithelium, lamina propria, and muscularis mucosa), underneath which is the submucosa, then the muscularis propria and the outermost layer called the adventitia. The structure of these layers varies in different regions of the digestive system. If the target tissue extends to any of the deeper layers of the GI wall, surgical or endoscopic full thickness resection may be required. The average procedure time for physicians in the western world is approximately 1-2 hours because the physician must carefully make many small cuts to completely dissect the entire area. The two main complications associated with this technique are bleeding and perforation through the muscularis propria and/or adventitia, and the rates of complication are quite high due to the technical difficulty of the procedure.

These iatrogenic complications occur due to several reasons. First, the mucosal flap during resection may not be elevated enough so that it obstructs the view of the physician to the point where the physician has limited to no visibility of the dissection plane. In this scenario, the physician can make a mistake and inadvertently cut a vessel or perforate through the muscle. Second, the dissection plane is visible but small, and the physician must cut in a small window because the submucosal fibers are close to the muscle and/or a vessel. In this scenario, the physician can make a mistake and inadvertently cut a vessel or perforate through the muscle. Third, the physician does not have a good position for making a cut due to limitations of the endoscope and anatomical positioning, thus making the dissection plane difficult to reach. In this scenario, the physician can make a mistake and inadvertently cut a vessel or perforate through the muscle. Fourth, the existing available cutting knives operated by electrocautery by delivering radiofrequency energy from electrosurgical generators. The inherent issue with using electrocautery is that there is an iatrogenic risk that the physician can accidentally cut tissue unintentionally, such as a blood vessel or muscle tissue.

Accordingly, it is desirable to provide devices and methods that will improve the ability of physicians to safely conduct ESD. In particular, it is desirable to provide devices and methods that will improve visibility of the target tissue to a physician during ESD, that will provide improved control of tissue-dissecting to decrease the risk of undesired cutting, and/or that will reduce ESD procedure time.

BRIEF SUMMARY

One general aspect of the present disclosure includes a medical device for facilitating a minimally invasive surgical procedure, including a housing configured for engagement around an outer circumferential surface of an endoscope and including a first cavity; and an arm, including at least one tissue-dissecting surface, movably received within the first cavity, where the arm is configured to perform a first predetermined movement along at least a first plane at a predetermined frequency, corresponding to reciprocating movement of a proximal portion of the arm.

Another general aspect of the present disclosure includes a medical device for facilitating a minimally invasive surgical procedure, including a housing having a first cavity; an arm including at least one tissue-dissecting surface and rotatably received within the first cavity, the arm including a first receiving slot and a second receiving slot; a first connecting member extending between a first distal end and a first proximal end of the first connecting member; and a second connecting member extending between a second distal end and a second proximal end of the second connecting member, where the first distal end of the first connecting member is slidably received within the first receiving slot, and the second distal end of the second connecting member is slidably received within the second receiving slot, and configured where manipulation of the first and second proximal ends causes the arm to rotate through at least an arc with respect to the housing.

Another general aspect of the present disclosure includes a medical device for facilitating a minimally invasive surgical procedure, including a housing having a first cavity and a third cavity; an arm rotatably received within the first cavity, the arm including a guide portion and a connecting portion; and a cam assembly rotatably received within the third cavity, the cam assembly including a cam track groove configured to slidably receive therein at least a portion of the guide portion, where the arm is rotatably connected to a third portion of the housing through the connecting portion, and where rotation of the cam assembly causes the guide portion to slide along a predetermined track within the cam track groove such that the arm is urged to rotate in a first plane.

Other systems, methods, features and advantages of the presently disclosed embodiments will be, or will become, apparent to one with skill in the art upon examination of the following figures and detailed description. It is intended that all such additional systems, methods, features, and advantages be within the scope of the invention.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure, although certain figures may be illustrated to scale and relied upon as such. Moreover, in the figures, like-referenced numerals designate corresponding parts throughout the different views.

DETAILED DESCRIPTION

Figure 1:
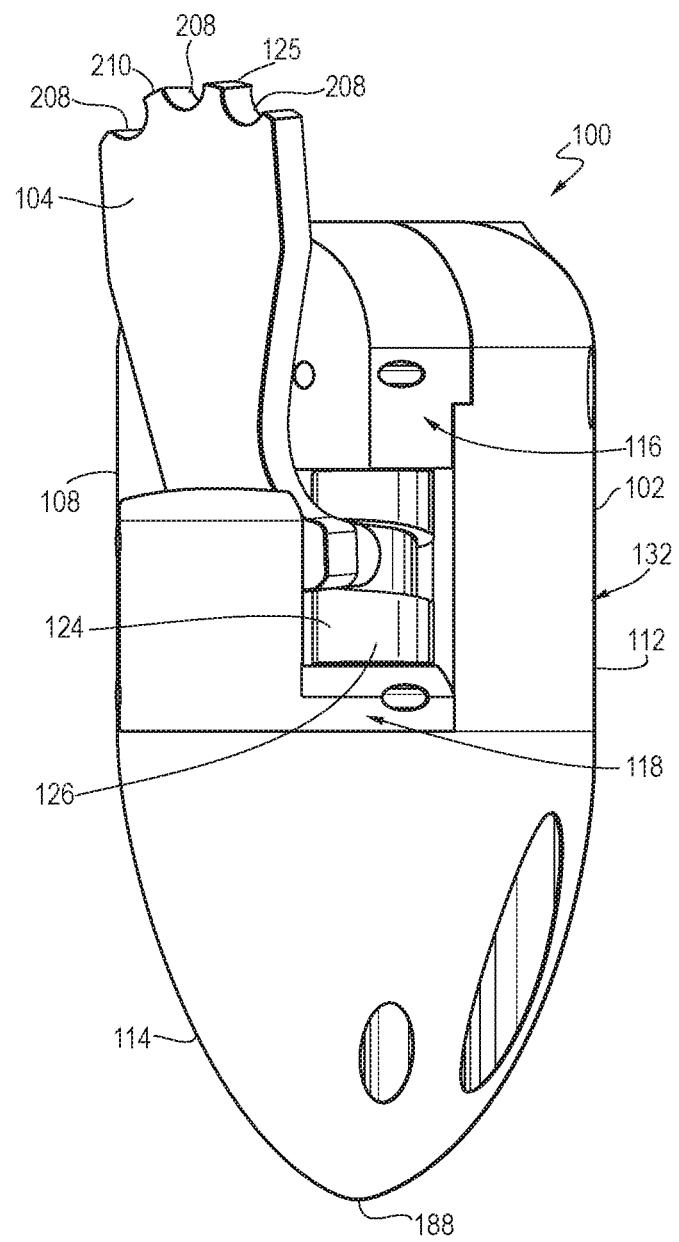
FIG. 1 is an illustration showing a perspective view of a first embodiment of an endoscopic resection cap with a built-in oscillating dissector in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale (although certain drawings may be drawn to scale and relied upon as such), and in certain instances details may have been omitted that are not necessary for an understanding of aspects disclosed herein, such as conventional material, construction, and assembly.

For purposes of promoting an understanding of the presently disclosed embodiments, reference will now be made to the embodiments illustrated in the drawings, and specific language will be used to describe the same. It should nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. In the present application, the term "proximal" refers to a direction that is generally towards a physician during a medical procedure, while the term "distal" refers to a direction that is generally towards a target site within a patient's anatomy during a medical procedure. The term "configured to" is used to describe structural limitations in a particular manner that requires specific construction to accomplish a stated function and/or to interface or interact with another component(s), and is not used to describe mere intended or theoretical uses. Relative terminology and broader terms such as "generally," "about," "substantially," and the like will be understood by those of skill in the art as providing clear and definite scope of disclosure and/or claiming. For example, the term "generally perpendicular" will be understood as not requiring exactly 90.00 degrees relative to a reference point, but rather including that and functional equivalents.

Certain aspects of the presently disclosed embodiments of a medical device, configured for use in a minimally invasive surgical procedure, provide an endoscopic resection cap with a built-in oscillating dissector that can be driven by a corresponding oscillating system to perform a predetermined movement. The oscillating motion of the dissector may perform a blunt dissection of tissue as an alternative method to, or used in conjunction with, electrocautery. Various embodiments of the oscillating dissector may be driven by various corresponding embodiments of the oscillating system to perform the predetermined movement, as described and depicted herein. Although different embodiments of the oscillating dissector may be described herein as working with one or more corresponding embodiments of the oscillating system, one of ordinary skill in the art, with a thorough review of the subject specification and figures, would readily comprehend how the different embodiments of the oscillating dissector and/or any combination thereof may be driven by other embodiments of the oscillating system and/or any combination thereof without undue experimentation.

An endoscopic resection cap with a built-in oscillating dissector may be installed onto an existing endoscope to facilitate difficult and time-consuming procedures such as endoscopic submucosal dissection (ESD). For the sake of brevity, various embodiments of the built-in oscillating dissector disclosed herein are described and depicted as an oscillating dissector to be incorporated into an endoscopic resection cap for use in ESD in the field of GI tissue resection. One of ordinary skill in the art, with a thorough review of the subject specification and figures, would readily comprehend how the oscillating dissector may be incorporated into the same or other devices for the same or other medical and/or experimental uses, and would comprehend which other devices and uses might be suitable without undue experimentation. For example, the oscillating dissector may be successfully implemented for use in peroral endoscopic myotomy (POEM), gastric peroral endoscopic myotomy (G-POEM), endoscopic mucosal resection (EMR), and other procedures that require manual dissection of tissue in the gastrointestinal tract.

Referring to FIGS. 1-10B, an embodiment of an endoscopic resection cap with a built-in oscillating dissector is shown. The endoscopic resection cap 100 may include a housing 102 having a first cavity 108, a second cavity 106, and a third cavity 110. An arm 104 including a main body 142 having at least one cutting surface 125 may be movably received within the first cavity 108. Unless expressly stated to be otherwise, for purposes of the present application, it should be understood that the term "cutting" used herein refers to blunt tissue disruption for tissue-dissecting rather than sharp-cutting incision of the type associated with a knife blade such as a scalpel blade. Stated differently, the distinction is that tissue-dissecting here will remove looser tissue such as diseased tissue of gastrointestinal submucosa, but without invading or injuring the underlying muscularis propria. The second cavity 106 may be configured for engagement around an outer circumferential surface of an endoscope, where it may be secured (removably or non-removably), for example—using a friction fit, attachment structures (such as adhesive, threaded connectors, straps, etc.), and/or any other attachment means. A cam assembly 126 of an oscillating system 124 may be rotatably received within the third cavity 110, such that a second predetermined movement (e.g., rotation) of the cam assembly 126 may cause the arm 104 to perform a first predetermined movement 128 along at least a first plane 130 at a predetermined frequency.

In some embodiments, the housing 102 may include an upper portion 132 and a lower portion 114 that connect to each other at a connecting surface 120 (the upper portion 132 and the lower portion 114 may be integrally formed). The upper portion 132 may include a first portion 112, a second portion 116, and a third portion 118. The third portion 118 may be movably connected to the connecting surface 120 of the lower portion 114 (e.g., through a threaded mechanism or any suitable mechanism), such that the third portion 118 may move substantially vertically upward relative to the connecting surface 120 (e.g., up to 5 mm). The first cavity 108 and the third cavity may be established by different portions of the housing 102. The second cavity 106 may extend through at least a portion of both of the upper portion 132 and the lower portion 114 of the housing 102 (e.g., as shown in FIG. 4) and may be configured to receive an endoscope therein through a friction fit. The housing 102 may have a generally cylindrical upper portion 132 extending towards a pointed end portion 188 in the lower portion 114, with the second cavity 106 extending therethrough along a side of the housing 102 (e.g., as shown in FIGS. 1-4). It will be appreciated that the overall configuration of the housing may be varied, as desired and/or needed, without departing from the scope of the present invention, to accommodate various configurations of the devices to be coupled thereto (e.g., an endoscope).

Figure 16:
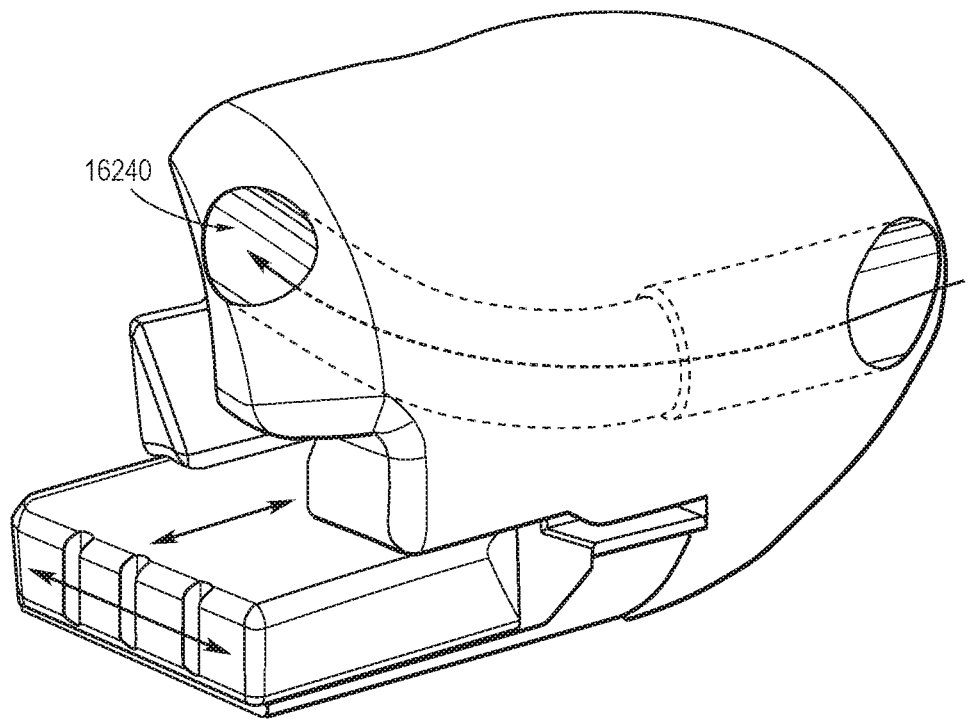
FIG. 16 is an illustration showing a perspective view of a sixth embodiment of an endoscopic resection cap with a built-in oscillating dissector and a longitudinal lumen in accordance with certain aspects of the present disclosure.
Figure 16A:
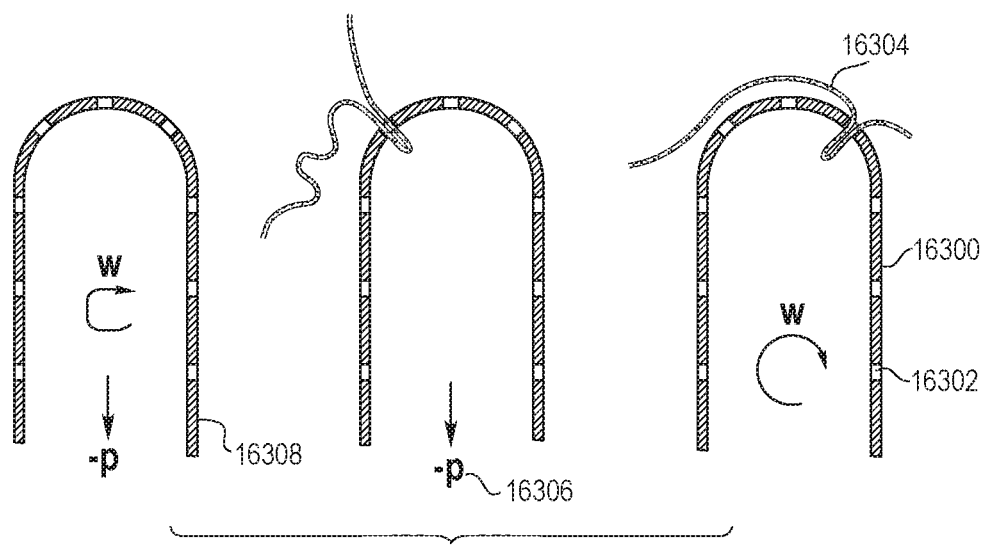
FIG. 16A is an illustration showing a front view of an accessory tool configured to be incorporated into the endoscopic resection cap of FIG. 16 in accordance with certain aspects of the present disclosure.

In some embodiments, the endoscopic resection cap 100 may also include one or more longitudinal lumens (e.g., the longitudinal lumen 16240, as shown in FIG. 16) configured to receive and direct therein accessory tools (e.g., endoscopic grasping tools and/or dissecting tools). Examples of an endoscopic resection cap with one or more longitudinal lumens are described in U.S. Patent Application Publication No. 2017/0112361, published Apr. 27, 2017 (Cook Medical Technologies LLC, of Bloomington, Ind. USA), which is hereby incorporated by reference in its entirety. In some embodiments, the accessory tools may include a suction-rotation accessory tool 16300, as shown in FIG. 16A. The suction-rotation accessory tool 16300 may include a catheter 16308 with holes 16302 on the distal end that fits into the longitudinal lumen 16240. The catheter 16308 may have a vacuum 16306 applied at the user end and may be rotatable by a drive system at the user end. In use, submucosal fibers may enter the holes 16302 via suction and may be stretched and broken by the rotation of the catheter 16308. The configuration of the suction-rotation accessory tool 16300 may be varied, as desired and/or needed, to accommodate the configuration of the longitudinal lumen 16240 of the endoscopic resection cap.

Figure 10A:
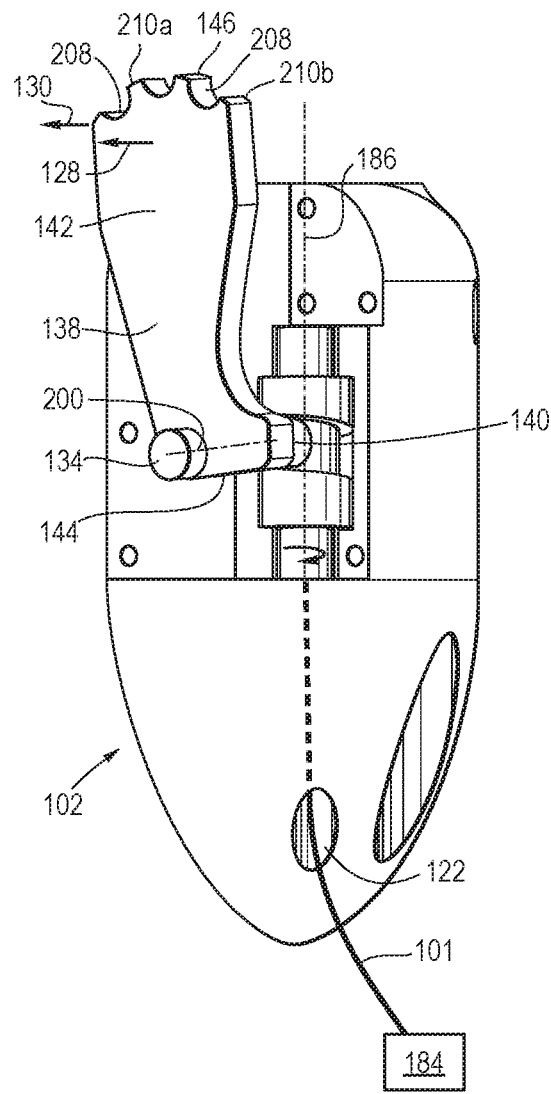
FIG. 10A is an illustration showing a cross-sectional view of the endoscopic resection cap of FIG. 1 with the built-in oscillating dissector moving in a first direction in accordance with certain aspects of the present disclosure.

In some embodiments, the arm 104 may include a main body 142 extending between a proximal end portion 144 and a distal end portion 146 and having a first surface 138 and an opposite surface 140. One or more surfaces of the at least one cutting surface 125 may be in a tooth configuration. For example, the cutting surface 125 may have a plurality of cutouts 208 (e.g., three cutouts as shown in FIG. 1) disposed apart from each other such that a plurality of discrete dissecting surfaces 210 (e.g., four dissecting surfaces as shown in FIG. 1) may be formed. The number, configuration (e.g., shape, dimension), and position of the plurality of cutouts 208 and the dissecting surfaces 210 may be varied, as desired and/or needed, to achieve a desired blunt cutting surface 125 for blunt dissection of tissue when the arm performs the first predetermined movement 128 (e.g., an oscillating movement), as described in greater detail below. For example, as shown in FIG. 10A, the dissecting surface 210*a* has a relatively flat surface with a greater dimension and thus may be used for dissecting tissue when the dissection plane is relatively big. The dissecting surface 210*b* has a relatively sharp surface with a smaller dimension and thus may be used for dissecting tissue when the dissection plane is relatively small. In use, the endoscopic resection cap 100 may be oriented, as desired and/or needed, such that the desired dissecting surfaces 210 may be oriented towards the tissue to be dissected to accommodate the corresponding dissection plane. The blunt cutting surface 125 may provide the ability to cut tissue safely without having to be as precise and careful to avoid cutting important structures unintentionally, thereby reducing complication rates and procedure time. Cutouts 208 may include one or more recessed sharp cutting surface(s) in some embodiments (not shown).

The arm 104 may also include a connecting portion 134 disposed adjacent to the proximal end portion 144 of the main body 142 and outwardly from the first surface 138, and a guide portion 136 disposed adjacent to the proximal end portion 144 of the main body 142 and outwardly from the opposite surface 140. Optionally, the arm 104 may also include a first extension 190 disposed adjacent to the proximal end portion 144 of the main body 142, outwardly from the opposite surface 140, and apart from the guide portion 136.

Figure 5:
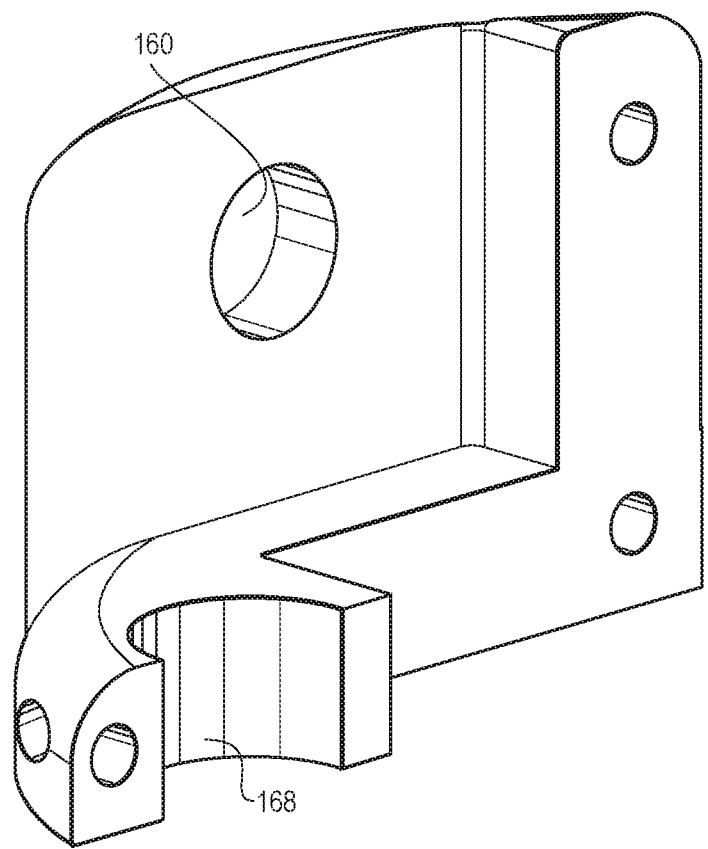
FIG. 5 is an illustration showing a perspective view of a third portion of the housing of the endoscopic resection cap of FIG. 1 in accordance with certain aspects of the present disclosure.
Figure 10B:
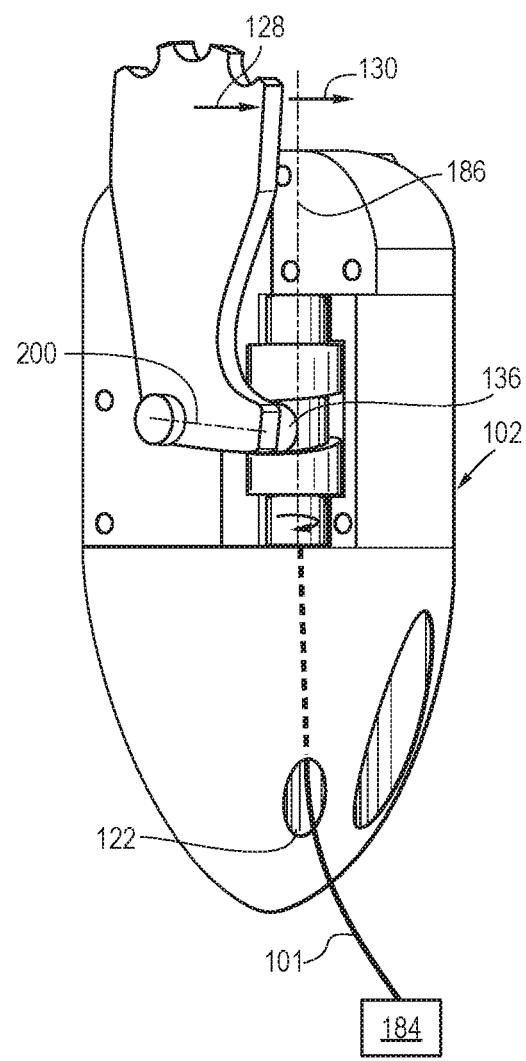
FIG. 10B is an illustration showing a cross-sectional view of the endoscopic resection cap of FIG. 1 with the built-in oscillating dissector moving in a second direction in accordance with certain aspects of the present disclosure.

The connecting portion 134 may be configured and positioned to be rotatably received within the third portion 118 (e.g., within a first groove 166 as shown in FIG. 5) of the upper portion 132 such that the arm 104 may be rotatable in the first plane 130 (e.g., as shown in FIGS. 10A and 10B). As the third portion 118 may move vertically upward with respect to the connecting surface 120 of the lower portion 114, the arm 104 may correspondingly extend (e.g., move away from the connecting surface 120) and retract (e.g., move toward the connecting surface 120) relative to the lower portion 114. Advantageously, this configuration provides the ability to dissect further into the tissue, as desired and/or needed. As such, the arm 104 may be movable between two fixed locations, an extended location and a retracted location, in which there is a positive stop to prevent excessive advancement in the housing 102, and a retracted positive stop to prevent trauma from occurring while the endoscopic resection cap 100 is inserted into the patient.

Figure 2:
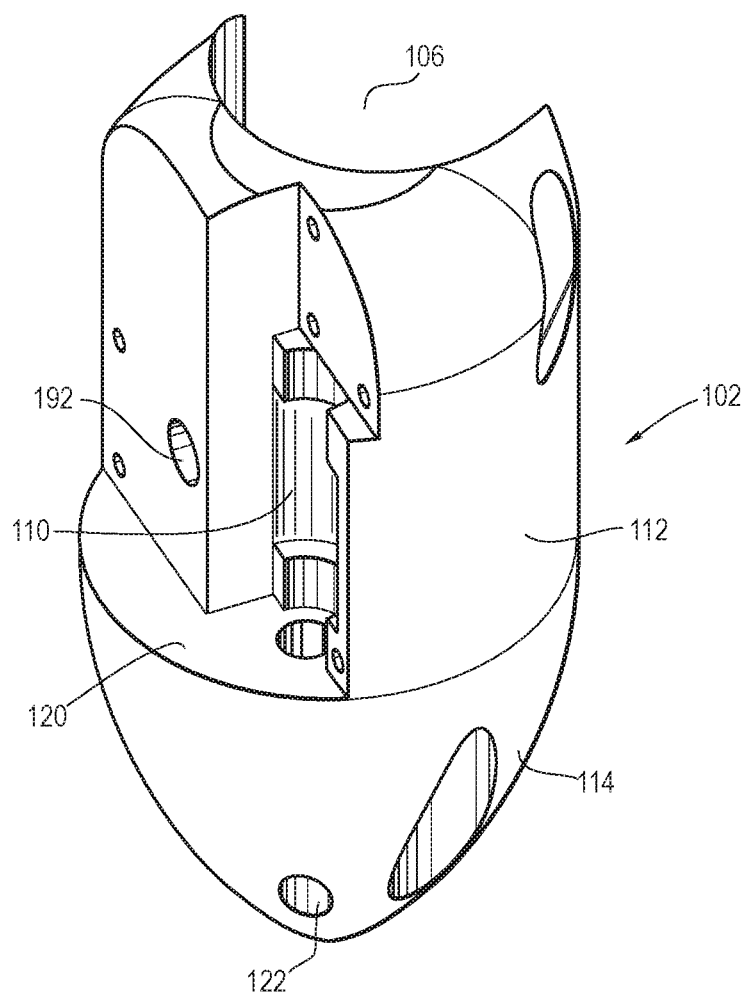
FIG. 2 is an illustration showing a perspective view of a portion of a housing of the endoscopic resection cap of FIG. 1 in accordance with certain aspects of the present disclosure.
Figure 3:
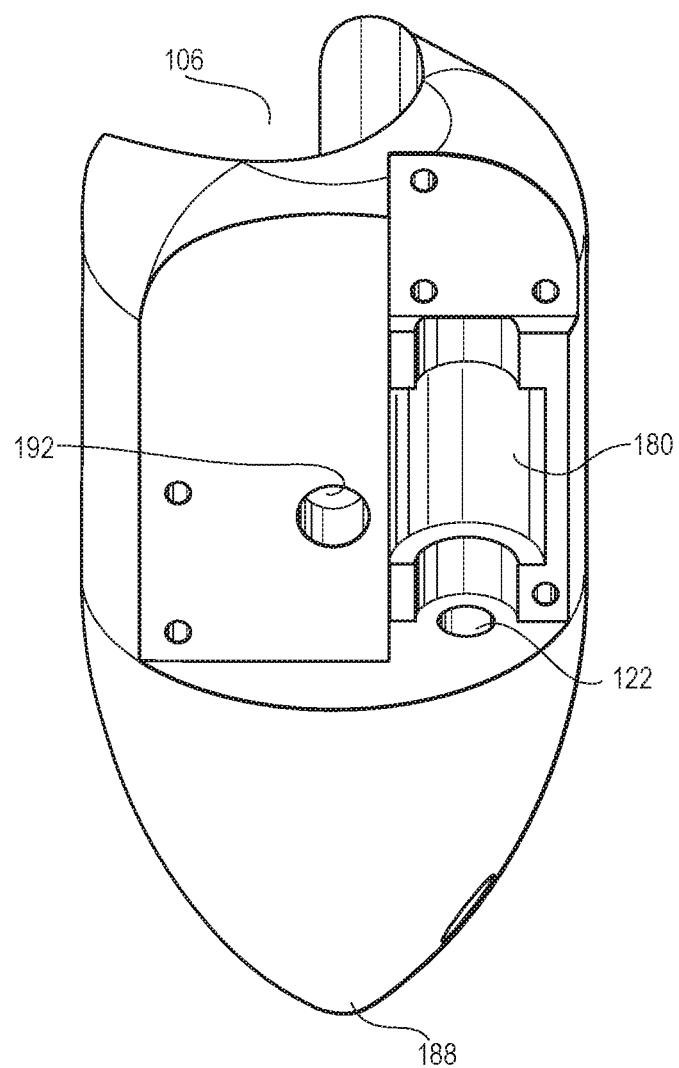
FIG. 3 is an illustration showing another perspective view of the portion of the housing of FIG. 2 in accordance with certain aspects of the present disclosure.
Figure 4:
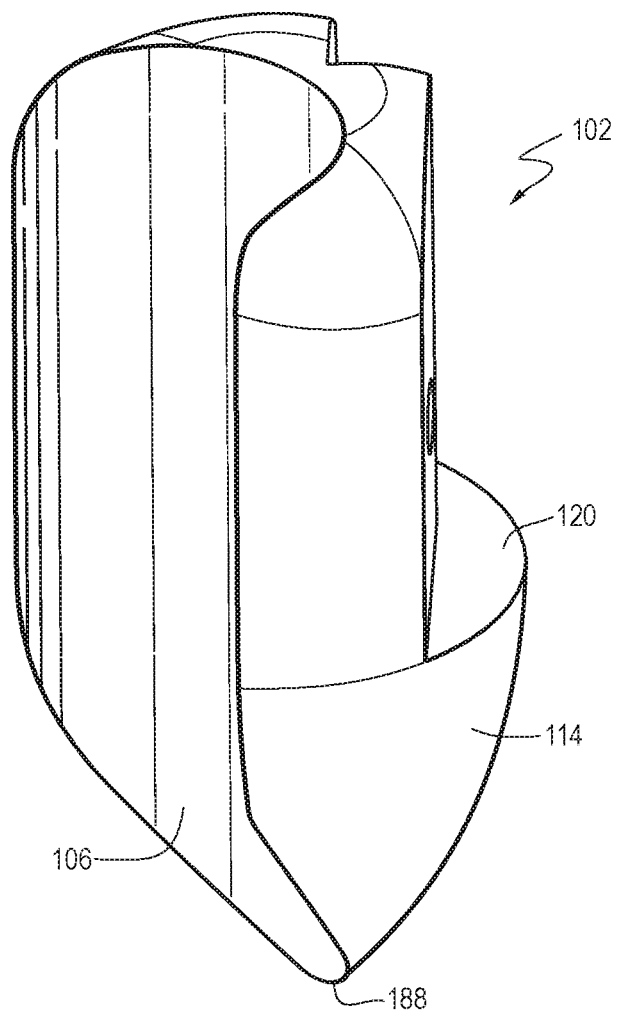
FIG. 4 is an illustration showing another perspective view of the portion of the housing of FIG. 2 in accordance with certain aspects of the present disclosure.
Figure 7:
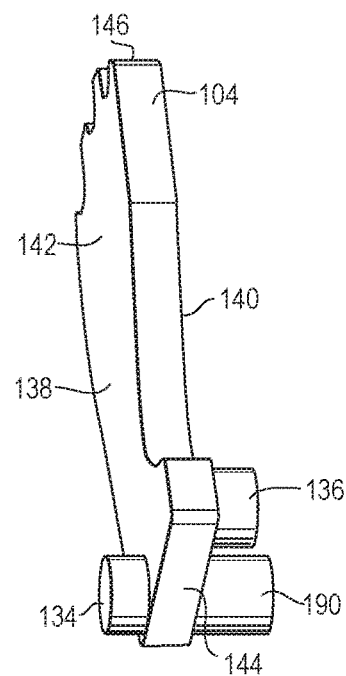
FIG. 7 is an illustration showing a perspective view of an arm of the endoscopic resection cap of FIG. 1 in accordance with certain aspects of the present disclosure.

Optionally, the first extension 190 may be configured and positioned to be rotatably received within the first portion 112 (e.g., within a second groove 192 as shown in FIGS. 2 and 3) of the upper portion 132, when the connecting portion 134 is rotatably received within the third portion 118. Even though the first extension 190 is optional, the connection between the first extension 190 and the first portion 112 may provide additional support and stability to the arm 104 during the arm's movement. In some embodiments, the connecting portion 134 and the first extension 190 each may have a substantially cylindrical configuration (e.g., as shown in FIGS. 7, 10A and 10B) extending generally perpendicular to the first plane 130. It will be appreciated that the configuration (e.g., shape, dimension) and position of the connecting portion 134 and the first extension 190 may be varied, as desired and/or needed (e.g., to accommodate the configurations and positions of the main body 142, the first groove 166, and the second groove 192, as shown in FIGS. 5 and 3, to provide desired support, and/or to reduce friction between contacting surfaces), without departing from the scope of the present invention, as long as the arm 104 may be rotatably connected to the third portion 118 and the first portion 112 of the housing 102.

The guide portion 136 of the arm 104 may be configured (e.g., the cylindrical configuration as shown in FIGS. 7, 10A, and 10B or any other suitable configurations) and positioned such that when the connecting portion 134 and the first extension 190 are respectively received within the first groove 166 and the second groove 192, the guide portion 136 may be slidably received within a cam track groove 194 of the cam assembly 126, as described in greater detail below.

Figure 8:
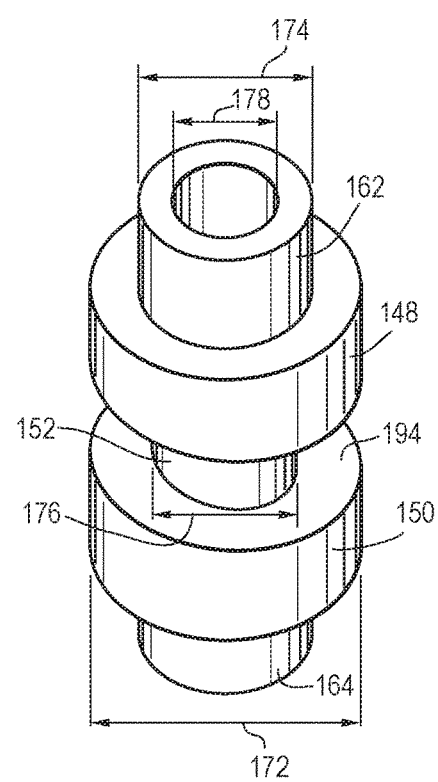
FIG. 8 is an illustration showing a perspective view of a cam assembly of the endoscopic resection cap of FIG. 1 in accordance with certain aspects of the present disclosure.
Figure 9:
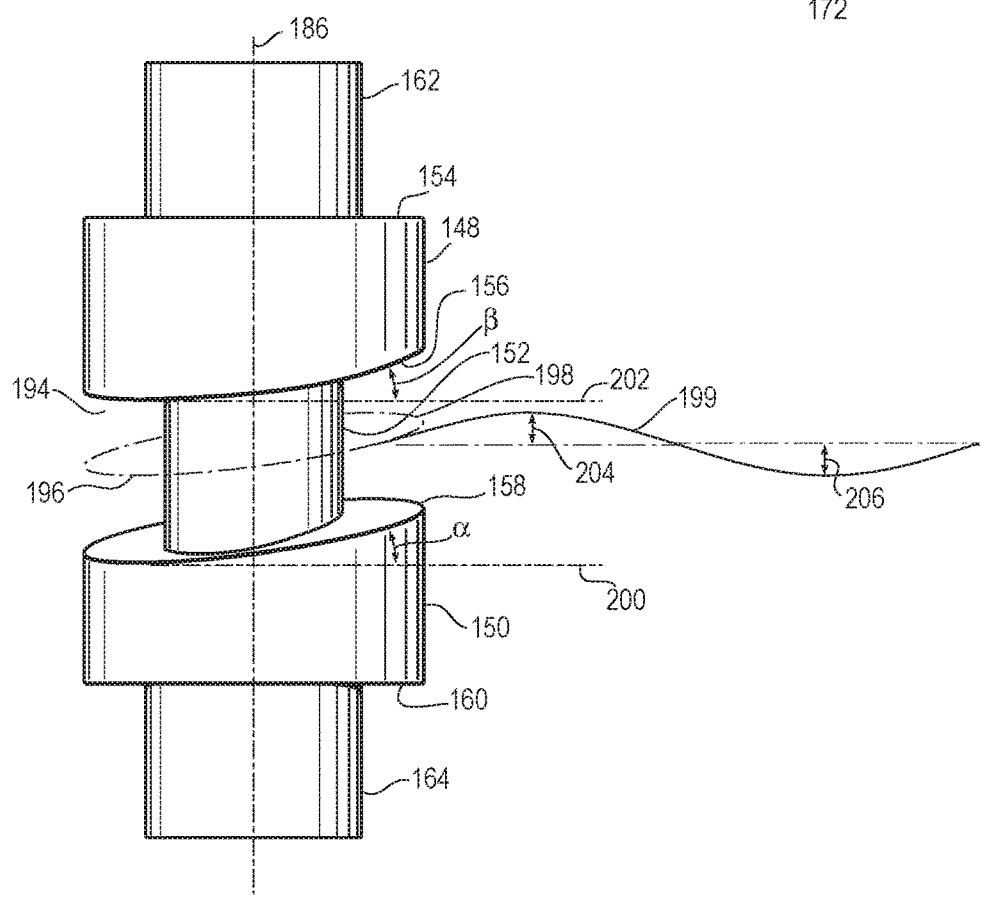
FIG. 9 is an illustration showing another perspective view of the cam assembly of FIG. 8 in accordance with certain aspects of the present disclosure.

In some embodiments, the cam assembly 126 may be a barrel cam, as illustrated in the present drawings, but those of skill in the art will be enabled by the present disclosure to use other camming mechanisms within the scope of this disclosure including its claims, such as—by way of non-limiting example—plate cam(s), face cam(s), and/or other cams or gears configured for translating motion of a proximal control element into oscillating movement of the arm including any sharp and/or non-sharp dissection surfaces. For the presently illustrated example, a barrel cam is shown in FIGS. 8 and 9, where the cam assembly 126 may include an upper portion 148, a lower portion 150, and an intermediate portion 152 disposed between the upper portion 148 and the lower portion 150. The upper portion 148 may have a first top surface 154 and a first bottom surface 156, and the first bottom surface 156 may be angled toward the first top surface 154. The lower portion 150 may have a second top surface 158 and a second bottom surface 160, and the second top surface 158 may be angled away from the second bottom surface 160.

Figure 6:
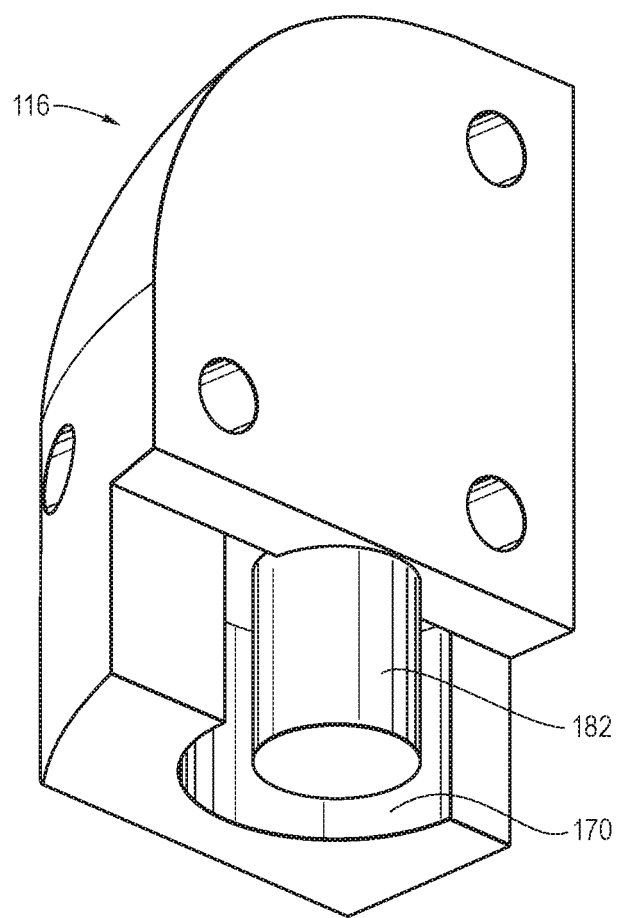
FIG. 6 is an illustration showing a perspective view of a second portion of the housing of the endoscopic resection cap of FIG. 1 in accordance with certain aspects of the present disclosure.

The cam assembly 126 may also include an upper connecting portion 162 extending outwardly from the first top surface 154 of the upper portion 148. The upper connecting portion 162 may be configured to be rotatably connected to (e.g., received within a first lumen 170 as shown in FIGS. 1 and 6) the second portion 116 of the upper portion 132 of the housing 102. The cam assembly 126 may also include a lower connecting portion 164 extending outwardly from the second bottom surface 160 of the lower portion 150. The lower connecting portion 164 may be configured to rotatably engage with (e.g., received within a first cutout 168, as shown in FIGS. 1 and 5) the third portion 118 of the upper portion 132 of the housing 102.

In some embodiments, the upper portion 148, the lower portion 150, the intermediate portion 152, the upper connecting portion 162, and the lower connecting portion 164 of the cam assembly 126 may substantially in a cylindrical configuration with a second lumen 178 extending through the cam assembly 126. The second lumen 178 may be configured such that when the upper connecting portion 162 is received within the first lumen 170 of the second portion 116, a second extension 182 (e.g., as shown in FIG. 6) of the second portion 116 may be rotatably received within the second lumen 178. When the cam assembly 126 is positioned within the third cavity 110, a drive system 184 may be connected to the cam assembly 126 through a wire 101 extending through a first channel 122 of the lower portion 114 of the housing 102 and through at least a portion of the second lumen 178 (e.g., as shown in FIGS. 2, 3, 10A, and 10B). The drive system 184 may include any suitable type of motor(s), located at the user end outside of the endoscopic resection cap 100 or built within the shaft of the endoscope, which are configured to generate mechanical movement and/or control to the oscillating system. For example, a proximal motion (e.g., rotary motion) at the user end of the drive system 184 may be transferred across the length of the wire 101 to the cam assembly 126, such that the cam assembly 126 may rotate around a first axis 186 (e.g., as shown in FIGS. 9-10B) at a predetermined frequency that is translated via the guide member 136 and arm to an oscillating motion of the distal end 146 at a desired frequency, such as a frequency between about 25 Hz and about 200 Hz. The term "about" is specifically defined herein to include the exact value referenced as well as a any value that is within 5% of the exact value including both above and below the exact value.

In some embodiments, as shown in FIGS. 8 and 9, the upper and lower portions 148 and 150 of the cam assembly 126 may have a first outer diameter 172, ranging from about 1.5 mm to about 6 mm. The upper and lower connecting portions 162 and 164 may have a second outer diameter 174 smaller than the first outer diameter 172, ranging from about 1 mm to about 4 mm. The intermediate portion 152 may have a third outer diameter 176 smaller than the second outer diameter 174, ranging from about 0.5 mm to about 4 mm.

The receiving/engaging portions of the first and third cavities 108 and 110, such as the first cutout 168 of the third portion 118 as shown in FIG. 5, the second cutout 180 of the first portion 112 as shown in FIG. 3, and the second extension 182 and the first lumen 170 of the second portion 116 as shown in FIG. 6, may be configured, such that the corresponding portions of the cam assembly 126 may be rotatably received therein with a suitable clearance, to provide necessary support and stability during the rotation of the cam assembly 126 while minimizing the friction between respective corresponding surfaces. It will be appreciated that the configuration (e.g., shape, dimension, arrangement) of the first, second and third portions 112, 116, and 118 of the upper portion 132 of the housing 102 and the different portions of the cam assembly 126 may be varied to achieve the functions described herein, without departing from the scope of the present invention, to accommodate various design needs, including but not limited to the configuration (e.g., shape, dimension) and position of the connecting surface 120, the arm 104, the second cavity 106, the first channel 122, and whether or not the housing 102 includes additional longitudinal lumen(s) to receive and direct therein accessory tools.

In some embodiments, a cam track groove 194 may be established by the first bottom surface 156, the second top surface 158, and an outer surface 196 of the intermediate portion 152. The cam track groove 194, as shown in FIGS. 9-10B, may be configured to slidably receive therein at least a portion of the guide portion 136, such that the rotation of the cam assembly 126 around the first axis 186 may cause the guide portion 136 of the arm 104 to slide within the cam track groove 194 along a predetermined track 198, such that the arm 104 may be urged to perform a predetermined oscillating movement 128 in a first plane 130 around a second axis 200 generally perpendicular to the first plane 130 and the first axis 186. It will be appreciated that the configuration of the guide portion 136 may be varied, as desired and/or needed, without departing from the scope of the present invention, as long as the outer surface of the guide portion 136 may engage with the first bottom surface 156 and the second top surface 158 such that the motion of the guide portion 136 may be controlled by the rotation of the cam assembly 126.

As shown in FIG. 9, for example, the first bottom surface 156 of the upper portion 148 may be angled toward the first top surface 154 at an angle β relative to an upper plane 202 parallel to the first top surface 154. The second top surface 158 of the lower portion 150 may be angled away from the second bottom surface 160 at an angle α relative to a lower plane 200 parallel to the second bottom surface 160. The angle β and α may be the same or different and may be varied, as desired and/or needed, to achieve different predetermined tracks 198 that the guide portion 136 of the arm 104 may slide along within the cam track groove 194. In some embodiments, the angle β may be between about 5 degrees and 45 degrees, and the angle α may be between about 5 degrees and 45 degrees. It will be appreciated that the rotation of the cam assembly 126 may cause the guide portion 136 to move upwardly or downwardly along the axis 186 relative to the lower portion 114 of the housing 102 (i.e., to move relative to the cam assembly 126 along the predetermined track 198), due to the angled surfaces of the cam track groove 194.

It will be appreciated that the curve 199 as shown in FIG. 9 presents the actual track of the up-and-down movement of the guide portion 136, as the cam assembly 126 finishes one rotation circle, by way of extending the predetermined track 198 relative to the cam assembly 126 into a curve to show a first amplitude 204 of the upward movement of the guide portion 136 and a second amplitude 206 of the downward movement of the guide portion 136 within the cam track groove 194. It will be appreciated that the predetermined track 198 (e.g., the first amplitude 204, the second amplitude 206, and the shape of the curve) may be varied by varying the angles β and α, the shape of the first bottom surface 156 of the upper portion 148, and/or the shape of the second top surface 158 of the lower portion 150. For example, the greater the angles β and α, the greater the first and second amplitudes 204 and 206 may be achieved. The predetermined track 198 may be composed of various shapes, including (but not limited to) curved, sinusoidal, and continuous wave. The size and configuration of the surfaces 156, 158 will directly affect the oscillatory motion of the arm with regard to both the arc length and frequency of oscillation relative to rotation of the cam assembly 126, including the ability to provide for multiple oscillations per rotation of the cam.

As shown in FIGS. 10A and 10B when the cam assembly 126 rotates around the first axis 186 and causes the guide portion 136 to move upwardly relative to the lower portion 114 of the housing 102, the arm 104 may be urged to rotate counter-clockwise in the first plane 130 (FIG. 10A). That is, as the cam assembly 126 rotates, the guide portion 136 of the arm 104 may act as a cam follower by engaging the cam track groove 194 to translate the rotational motion of the cam assembly 126 to an oscillatory motion of the arm 104. There is a greater mechanical advantage by having the cam assembly 126 located at the distal end inside the endoscopic resection cap 100 as opposed to located at the proximal user end and transmitting force down a long catheter and losing force transmission from the rotary motion at the user end.

When the cam assembly 126 rotates around the first axis 186 and causes the guide portion 136 to move downwardly relative to the lower portion 114 of the housing 102, the arm 104 may be urged to rotate clockwise in the first plane 130 (FIG. 10B). The continuous rotation of the cam assembly 126 around the first axis 186 may cause the arm 104 to oscillate along a predetermined arc length in the first plane 130. The predetermined arc length may be varied, as desired and/or needed, by varying the configuration of the cam track groove 194 (e.g., by varying angles β and α to vary the first amplitude 204 and the second amplitude 206). For example, the greater the first and second amplitudes 204 and 206, the greater the arc length may be achieved. In some embodiments, the cam track groove 194 may be configured such that the rotation of the cam assembly 126 may cause the arm 104 to oscillate in the first plane 130 along an arc length between about 0.5 mm and about 7.0 mm, but which may be up to about 30 mm, in response to interaction with the cam assembly rotation. The oscillation frequency of the arm 104 may also be predetermined through the drive system 184, such as oscillating at a predetermined frequency between about 25 Hz and about 200 Hz.

Advantageously, such an oscillating movement of the blunt cutting surface 125 of the arm 104 (e.g., along a relatively small arc length at a relatively high frequency) provides the ability to bluntly dissect the cancerous tissue in the submucosal layer in various dissection planes that are visible but small, without the need for the physician to carefully make many small cuts to completely dissect the entire area, thereby reducing the possibility of making mistakes and inadvertently cutting a vessel or perforate through the muscle. The blunt dissection provided by the oscillating movement of the arm 104 also provides the ability to avoid the inherent complications associated with electrocautery, such as bleeding and perforation.

Figure 11:
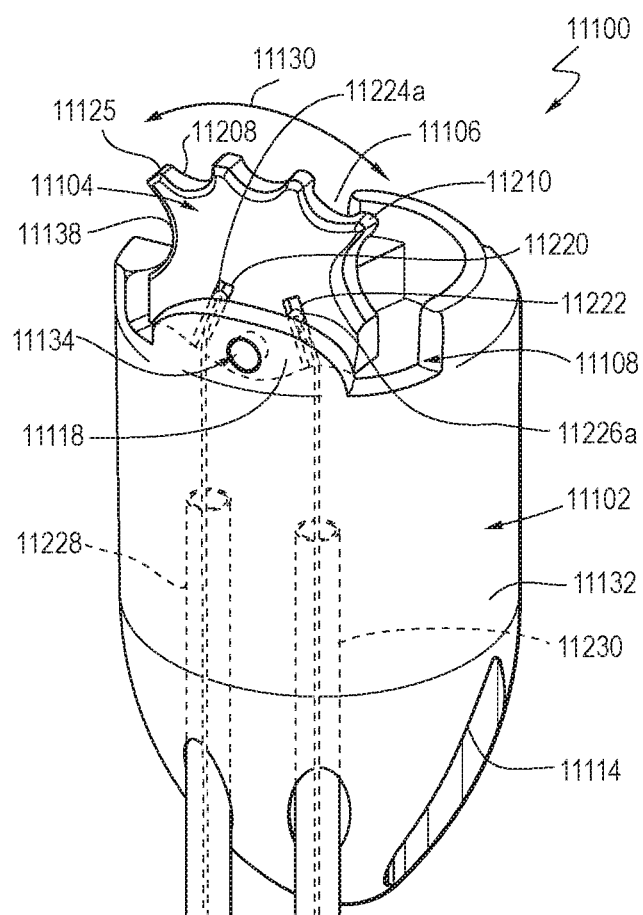
FIG. 11 is an illustration showing a perspective view of a second embodiment of an endoscopic resection cap with a built-in oscillating dissector in accordance with certain aspects of the present disclosure.
Figure 11A:
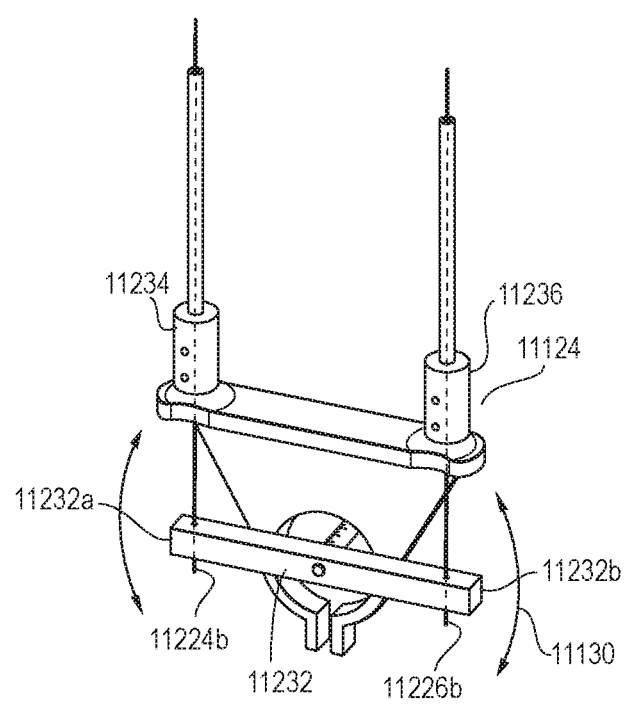
FIG. 11A is an illustration showing a perspective view of an oscillating system configured to be able to cause the built-in oscillating dissector of FIG. 11 to oscillate in accordance with certain aspects of the present disclosure.

Referring to FIGS. 11-11A, another embodiment of an endoscopic resection cap with a built-in oscillating dissector is shown. The endoscopic resection cap 11100 may include a housing 11102 having an upper portion 11132 and a lower portion 11114. The housing 11102 may include a first cavity 11108 and a second cavity 11106. The first cavity 11108 may be configured and positioned such that an arm 11104 may be rotatably received therein and connected to a third portion 11118 of the upper portion 11132 through a connecting portion 11134. The second cavity 11106 may be configured for engagement around an outer circumferential surface of an endoscope. In some embodiments, the second cavity 11106 may extend through at least a portion of both of the upper portion 11132 and the lower portion 11114 of the housing 11102 (e.g., similar to the configuration as shown in FIG. 4) and may be configured to receive an endoscope therein through a friction fit.

The arm 11104 may include at least one cutting surface 11125 with a plurality of cutouts 11208 and a plurality of dissecting surfaces 11210, as described in greater detail above. In some embodiments, as shown in FIG. 11, the arm 11104 may include a first receiving slot 11220 and a second receiving slot 11222 on a first surface 11138. The first receiving slot 11220 and the second receiving slot 11222 may be movably connected to a first connecting member 11224 and a second connecting member 11226, respectively.

The first connecting member 11224 may extend between a first distal end 11224a and a first proximal end 11224b of the first connecting member 11224. The second connecting member 11226 may extend between a second distal end 11226a and a second proximal end 11226b of the second connecting member 11226. The first distal end 11224a of the first connecting member 11224 may be slidably received within the first receiving slot 11220, and the second distal end 11226a of the second connecting member 11226 may be slidably received within the second receiving slot 11222, such that manipulation of the first and second proximal ends 11224b and 11226b may cause the arm 11104 to rotate in a first plane 11130 through at least an arc with respect to the housing 11102. In some embodiments, the first and second connecting members 11224 and 11226 may be axially stiff pull wires, which may be composed of flexible stainless-steel wire rope, polymeric composition including for example UHMWPE fiber, other stainless steel or metallic construction, or other polymeric construction, which applies to all embodiments. At least a portion of the first and second connecting members 11224 and 11226 may extend through respective first and second sheaths 11228 and 11230. The first and second sheaths 11228 and 11230 may be axial compression stiff sheaths and may be composed of closed coil stainless steel spring with a polymer outer jacket. The first and second distal ends 11224a and 11226a each may have a cap configuration (may be composed of a polymer material) that is shaped and/or sized such that the first and second distal ends 11224a and 11226a may be slidably received within the respective first and second receiving slots 11220 and 11222 without disengaging therefrom (e.g., falling out) during the rotation of the arm 11104.

The first and second connecting members 11224 and 11226 may extend through the housing 11102, such that their respective first and second proximal ends 11224b and 11226b extend outside the lower portion 11114 of the housing 11102 and coupled to an oscillating system 11124 for guiding the rotation of the arm 11104. In some embodiments, as shown in FIG. 11A, the oscillating system 11124 may include a guide member 11232 extending between a first end portion 11232a and a second end portion 11232b. The guide member 11232 may be comprised of a polymer or metal component. The first proximal end 11224b of the first connecting member 11224 may be connected to the first end portion 11232a of the guide member 11232 and the second proximal end 11226b of the second connecting member 11226 may be connected to the second end portion 11232b of the guide member 11232.

In some embodiments, the oscillating system 11124 may include a first post 11234 and a second post 11236 respectively coupled to the proximal ends of the first and second sheaths 11228 and 11230. The first and second posts 11234 and 11236 each may include an opening configured to allow the first and second proximal ends 11224b and 11226b of the respective first and second connecting members 11224 and 1126 to respectively pass through before respectively connecting to the first end portion 11232a and the second end portion 11232b of the guide member 11232. Advantageously, the first and second sheaths 11228 and 11230 and the first and second posts 11234 and 11236 may provide support to the first and second connecting members 11224 and 11226 along at least a portion of the length thereof during motion. The first and second posts 11234 and 11236 and the first and second sheaths 11228 and 11230 may also provide the ability to define the rotational plane of the arm 11104, such that when the guide member 11232 rotates in the first plane 11130, the arm 11104 will also rotate in the first plane 11130.

The guide member 11232 may be connected to a drive system (e.g., the drive system discussed above) such that the guide member 11232 may be rotatable in the first plane 11130. When the guide member 11232 rotates in the clockwise direction in the first plane 11130, it may cause one of the first and second connecting members 11224 and 11226 (e.g., the second connecting member 11226, as shown in FIGS. 11 and 11A) to be pulled such that the arm 11104 may rotates in the clockwise direction in the first plane 11130. When the guide member 11232 rotates in the counter-clockwise direction in the first plane 11130, it may cause the other one of the first and second connecting members 11224 and 11226 (e.g., the first connecting member 11224, as shown in FIGS. 11 and 11A) to be pulled such that the arm 11104 may rotate in the counter-clockwise direction in the first plane 11130. As discussed above, the oscillating system 11124 and the drive system may be configured such that the arm 11104 may be urged to rotate with respect to the housing 11102 along a predetermined arc length (e.g., between about 0.5 mm and about 7.0 mm, up to about 30 mm) at a predetermined frequency (e.g., between about 25 Hz and about 200 Hz). The predetermined arc length may be varied, as desired and/or needed, by varying the configuration (e.g., geometry) of the arm 11104 and the first and second receiving slots 11220 and 11222, without departing from the scope of the present invention.

Figure 11B:
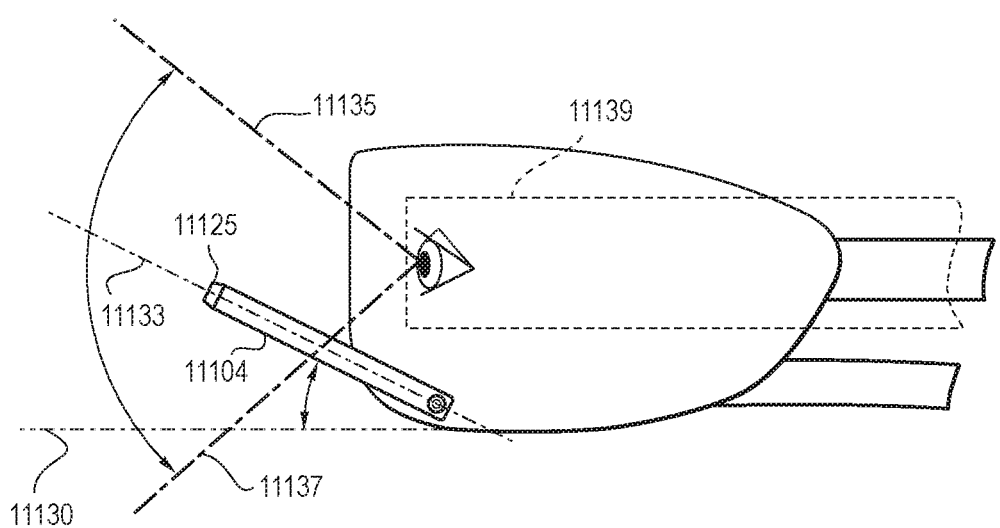
FIG. 11B is an illustration showing a cross-sectional view of the endoscopic resection cap of FIG. 11 with the built-in oscillating dissector moving out of a first plane in accordance with certain aspects of the present disclosure.

In some embodiments, the arm 11104 may be rotatably and pivotally connected to the third portion 11118 of the upper portion 11132 through the connecting portion 11134, such that manipulation of the guide member 11132 may cause one or two of the first and second connecting members 11224 and 11226 to move such that the arm 11104 may pivot out of the first plane 11130 in the first cavity 11108. For example, as shown in FIG. 11B, the arm 11104 may pivot into the second plane 11133 at an angle φ relative to the first plane 11130. The angle φ may be between about 0 and about 45 degrees. In this configuration, the guide member 11132 may be rotatable within the second plane 11133, such that rotation of the guide member 11132 may cause the arm 11104 to rotate in the second plane 11133.

Advantageously, this configuration allows the user to set the height of the built-in oscillating dissector to facilitate cutting closer to the tissue and provides greater visibility of the edge of the cutting surface 11125. In other words, the dissector can rotate into (angled and point out of the original dissection plane) the field of view (visible field) of the physician such that the dissection plane is well visible (e.g., adjacent to the center of the field of view), thereby facilitating accurate cutting. Otherwise, the cutting surface of the dissector may be located adjacent to the boundary of the field of view, where the dissection plane is not well visible, and the oscillating movement of the dissector may obstruct the physician's view of the dissection plane, which would contribute to inaccurate cutting. For example, as shown in FIG. 11B, when the arm 11104 pivots into the second plane 11133, the edge of the cutting surface 11125 is adjacent to the center of the field of view 11135 of the endoscope 11139, rather than at the boundary 11137 of the field of view 11135, such that the dissection plane and blood vessels will be visible at all times. Additionally, the ability of the arm 11104 to pivot into various planes and oscillate in the various planes allows the arm 11104 to interact with tissue in various dissection planes, including those in difficult anatomical positions. Advantageously, it provides some flexibility to accommodate different positioning's of the built-in oscillating dissector due to the limitations of the endoscope, different positions of the endoscope, as well as the anatomical positioning of the patient.

Figure 12:
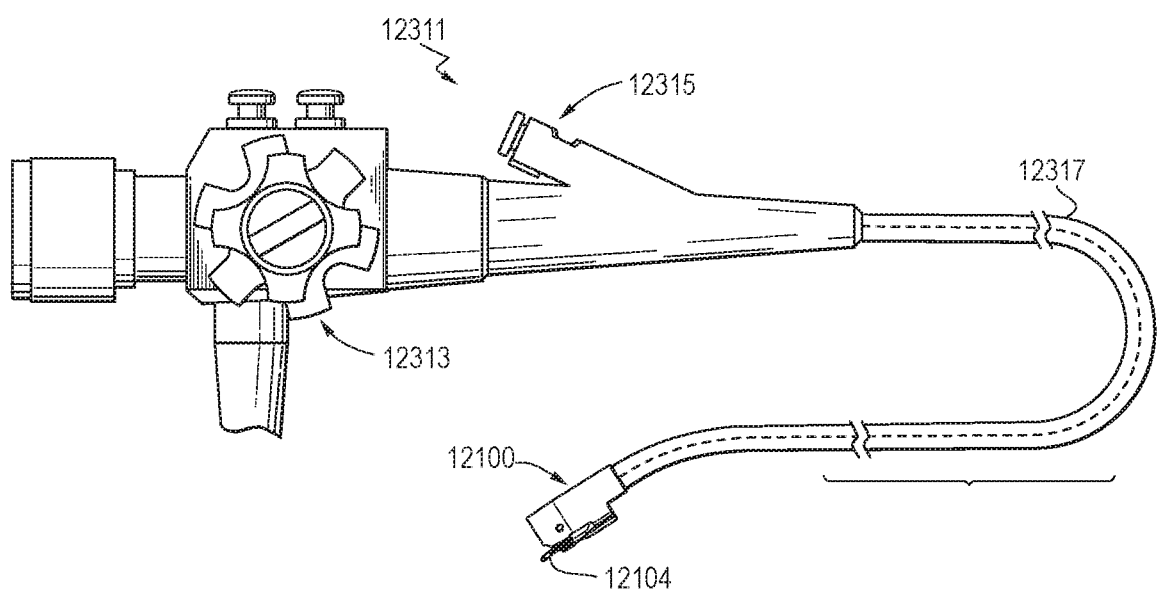
FIG. 12 is an illustration showing a simplified view of an endoscope including a third embodiment of an endoscopic resection element (according to any embodiment disclosed herein), which may be a cap removably disposed on and around the distal end of a separately usable endoscope, or which may be an integral component of an endoscope configured particularly for performing endoscopic resection among other endoscopic tasks.
Figure 13A:
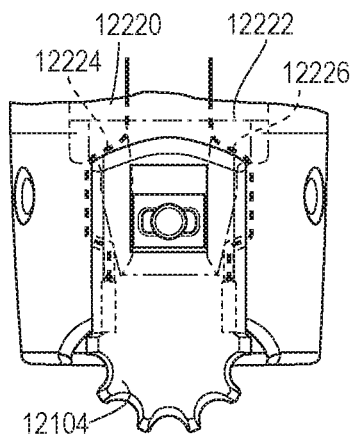
FIGS. 13A, 13B, and 13C are diagrammatic illustrations showing, respectively, the centered, left-most, and right-most positions of a dissector moving reciprocatingly relative to a holding pin.
Figure 13B:
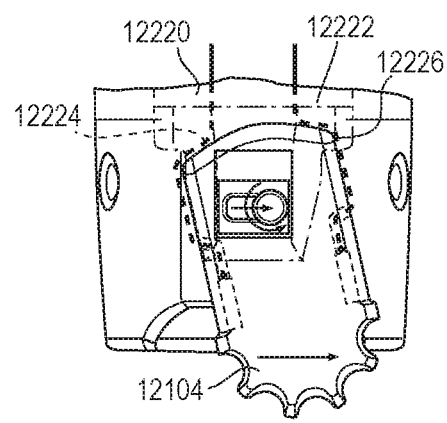
Figure 13C:
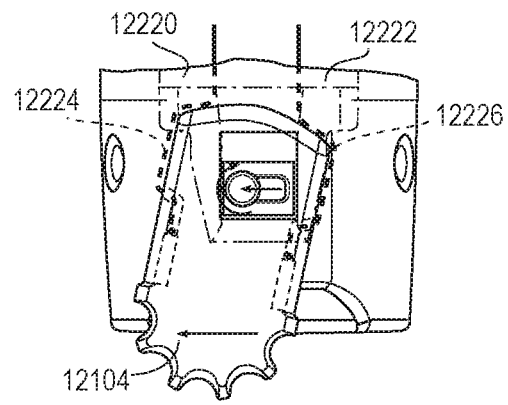
Figure 13D:
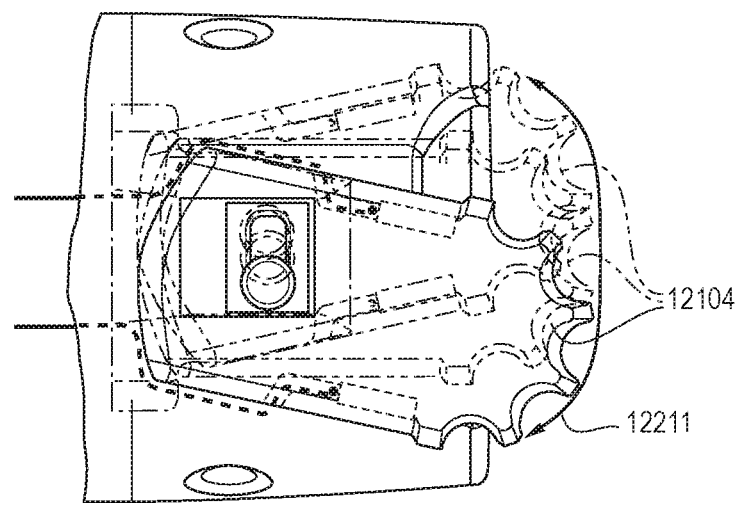
FIG. 13D shows an aggregated illustration of FIGS. 13A-13C with a diagrammatic depiction of the dissection path effected thereby.

FIGS. 12-13D show another embodiment of an endoscopic resection device 12100. FIG. 12 shows a generic and non-limiting endoscope 12311. This or any endoscope may be equipped with a removably-mounted endoscopic resection cap (e.g., cap 12311), or may be constructed with a built-in endoscopic resection element using the same type of oscillating or reciprocating dissector element as shown in any of the embodiments herein, expressly including any of FIGS. 1-11B, 14-20, and 23-25. Those of skill in the art will recognize that an endoscope 12311 may include steering controls 12313, at least one access port 12315, at least one visualization element (not shown, but readily understood as present by those familiar with the endoscope arts), and a steerable endoscope shaft 12317 that includes one or more end-viewing and/or side-viewing elements (not shown) near the distal end of the shaft, as well as other structures that may be present for illumination, irrigation, passage of tools and/or medicaments, and other features known in the endoscope art. It should be noted that the term "reciprocating" is used herein to denote motion that is not simply rotation around a fixed axis, but rather also includes motion across a fixed axis with or without any rotation relative to that axis. This reciprocating structure and function, as well as the longitudinal curve of the arm described below, differentiate this embodiment from that of FIG. 11, but the remaining features are alike or otherwise interchangeable, and the motion mechanism of FIG. 11A may also be used with this embodiment.

Figure 12A:
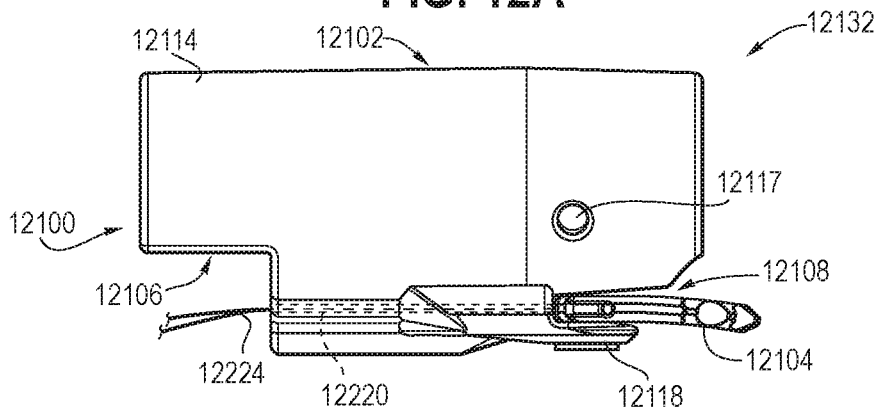
FIG. 12A is an illustration showing a side view of an endoscopic resection element including a reciprocating dissector and a drain hole.
Figure 12B:
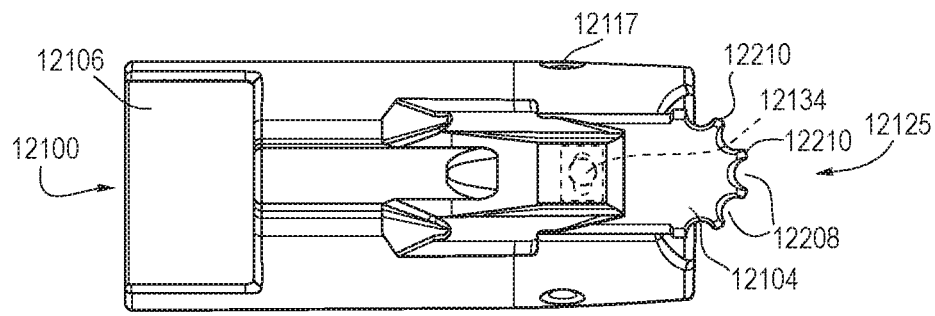
FIG. 12B is an illustration showing a bottom view of the endoscopic resection element of FIG. 12A.

As shown in FIGS. 12A and 12B, the endoscopic resection cap 12100 includes a housing 12102 having an upper portion 12132 and a lower portion 12114. It may also include a drain aperture 12117, configured for helping to clearing material from the viewing field of an endoscope. The housing 12102 may include an external first cavity 12108 and an internal second cavity 12106. The first cavity 12108 may be configured and positioned such that an arm 12104 may be received therein and connected laterally reciprocatingly to a third portion 12118 of the upper portion 12132 through a connecting pin 12134. The second cavity 12106 may be configured for removable engagement around an outer circumferential surface of an endoscope (or may be substantially absent in embodiments where the resection portion is integrally constructed with an endoscope). In some embodiments, the second cavity 12106 may extend through at least a portion of both of the upper portion 12132 and the lower portion 12114 of the housing 12102 (e.g., similar to the configuration as shown in FIG. 4) and may be configured to receive an endoscope therein through a friction fit or other releasable/removable attachment means that secures the cap releasably to an endoscope for use as an endoscope accessory tool.

Figure 12C:
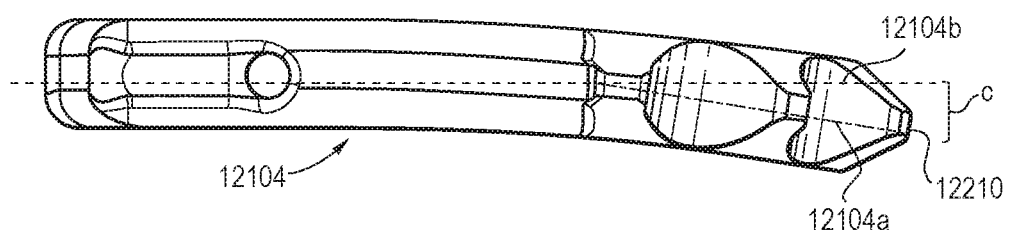
FIG. 12C is an illustration showing a side view of the dissector of the embodiment of FIGS. 12A-12B.
Figure 12D:
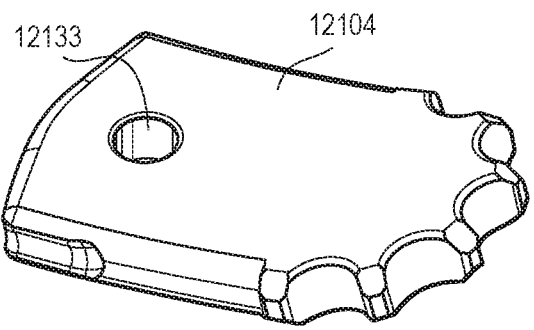
FIG. 12D is an illustration showing a rotated perspective view of the dissector of the embodiment of FIGS. 12A-12C.

The arm 12104 may include at least one cutting surface 12125 with a plurality of cutouts 12208 and a plurality of dissecting surfaces 12210, as described in greater detail above. In this embodiment, the arm 12104 includes a first receiving channel 12220 and a second receiving channel 12222. The first receiving channel 12220 and the second receiving channel 11222 provide slidable passage for a first connecting member embodied as first pull wire 12224 and a second connecting member embodied as second pull wire 12226, respectively. FIG. 12C-12D show, respectively, a side view and a rotated perspective of the arm 12104, which is curved along its proximal-distal longitudinal axis, and which includes a curved end opposite the dissecting end. The longitudinal dimension's curvature (shown along broken longitudinal axis line 12104*b*, as contrasted with curvature phantom line 12104*a*) is configured to provide for effective dissection operation during actuation of the arm 12104 by orienting its distal dissecting surfaces 12210 toward the target tissue without the endoscope's orientation having to change significantly from a normal alignment within the body passage being accessed. The difference between the straight line axis 12104*b* and the curvature 12104*a* of this embodiment in FIG. 12C (with exemplary arm length of 0.48 inches and width of 0.28 inches) is represented by the gap C, where the radius of curvature shown is 2 inches with a gap C of 0.03 inches, with other embodiments that can have a radius of curvature of 0.5 to 5 inches with a corresponding gap of 0.005 to 2 inches, which may vary for different-sized arms. In particular, the angle provides for an angle relative to the target tissue such that as the physician maneuvers the endoscope (with cap or integrated dissector tool end) the arm's curve is oriented towards the muscularis propria. This curvature provides an advantage over a straight dissector because it allows the physician to move the endoscope forward along its primary axis in the active area, while still targeting the correct dissection plane. In embodiments with a dissector that is straight (and not adjustable as taught elsewhere herein), the physician would need to actively angle endoscope with cap (or integrated tool end) towards the muscularis propria to disrupt the overlying target tissue. This would typically require multiple fine directional adjustments with the endoscope. Furthermore, with a straight/non-adjustable dissector that is aligned longitudinally with a distal-viewing endoscope, the endoscope camera trajectory would be forced to be pointed towards the muscularis propria to have the arm contact target tissue, which may limit the view of the submucosal space. Accordingly, the curved arm 12104 provides advantages over prior systems and devices.

The first wire 12224 extends to and connects into one side of the arm 12104, and the second wire 12226 extends to and connects into an opposed side of the arm 12104, where majority lengths of the first and second wires (not shown, between the resection portion and a proximal wire end) may be parallel or generally parallel when the arm is in a neutral centered position as shown in FIGS. 12B and 13A. An aperture 12133 through the arm 12104 between the wires provides for lateral reciprocating movement of the arm relative to and/or with the pin 12134. An elongate, stadium-shaped, or obround aperture/track of the housing faces into opening 12108 as drawn in FIGS. 13A-13D. This aperture/track, along which the pin 12134 rides, is constructed of a rectangle body with parallel linear sides and rounded, semi-circular, or oval ends, but the shape of the aperture/track may be varied within the scope of the present application to alter the desired movement of the arm relative to the housing, e.g., with an elliptical, arced, or otherwise-shaped aperture/track that provides for reciprocation of the pin across the track rather than simple pivoting rotation around the pin. This placement and attachment of the first and wires as well as of the pin 12134 through aperture 12133 of arm 12104 is configured such that manipulation of the first and second proximal wires causes the arm 12104 to reciprocate along a first plane 12130 so that the dissector surfaces 12210 describe at least an arc 12211 with respect to the housing 12102, as shown in FIGS. 13A (centered), 13B (left-wire pulled to move the arm 12104 so that its distal end is leftmost and its proximal end is rightmost), 13C (right-wire pulled to move the arm 12104 so that its distal end is rightmost and its proximal end is leftmost), and 13D. The arm reciprocates back and forth, with the pin moving back and forth across and along the aperture/track, while simultaneously rocking back and forth of the arm in response to pull upon a corresponding wire, with range of motion being limited by the housing 12102 and the relationship between the pin and aperture. As shown in the FIG. 13D, which is a composite of FIGS. 13A, 13B, and 13C, the distal end surfaces of the arm describe a flattened arc for contacting the target tissue as the proximal arm end reciprocates back and forth relative to the pin (with some pivoting motion) and the distal arm end oscillates correspondingly.

Figure 14:
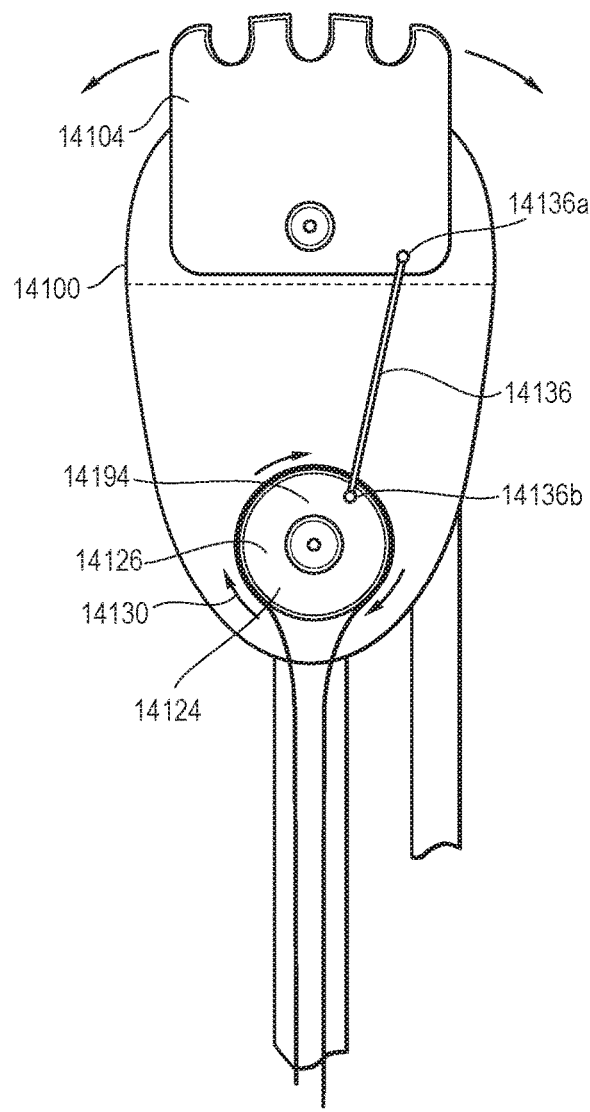
FIG. 14 is an illustration showing a diagrammatic cutaway view of a fourth embodiment of an endoscopic resection cap with a built-in oscillating dissector in accordance with certain aspects of the present disclosure.

FIG. 14 shows another embodiment of an endoscopic resection cap 14100 with a built-in oscillating dissector, which may include an arm 14104, a connecting guide 14136, and an oscillating system 14124. The connecting guide 14136 may extend between a distal end 14136*a* connected to the arm 14104 and a proximal end 14136*b*. The oscillating system 14124 may include a cam assembly 14126 having a cam surface 14194 configured to engage with the proximal end 14136*b* of the connecting guide 14136. The cam assembly 14126 may be coupled to a drive system (e.g., a pulley system) such that the cam assembly 14126 may be rotatable in a first plane 14130. In some embodiments, as shown in FIG. 14, rotation of the cam assembly 14126 in the first plane 14130 may cause the proximal end 14136*b* of the connecting guide 14136 to move along at least a portion of the cam surface 14194 such that, in response, the arm 14104 may perform the first predetermined movement (e.g., an oscillating movement along a predetermined arc length) at a predetermined frequency, as discussed in greater detail above.

Figure 15:
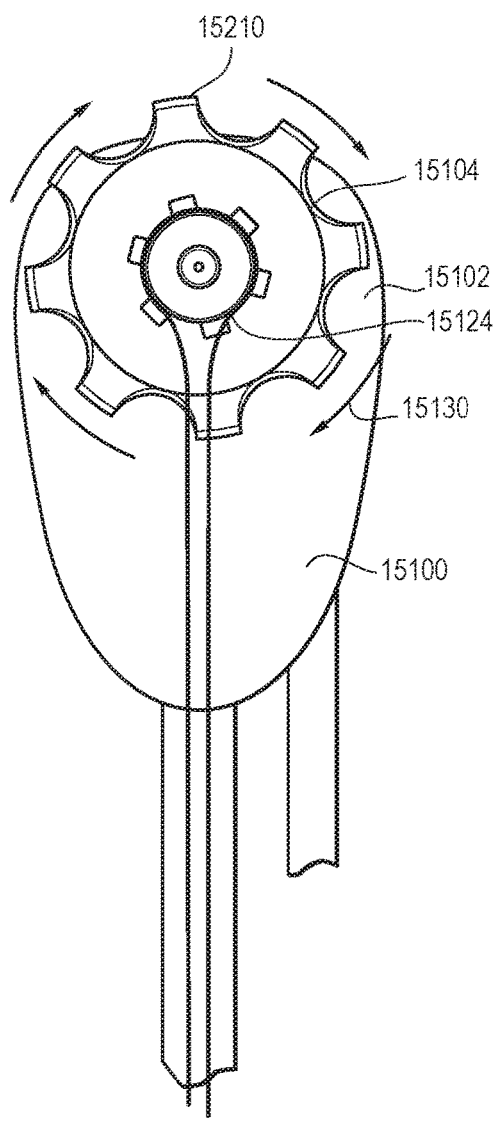
FIG. 15 is an illustration showing a diagrammatic cutaway view of a fifth embodiment of an endoscopic resection cap with a built-in oscillating dissector in accordance with certain aspects of the present disclosure.

FIG. 15 shows another embodiment of an endoscopic resection cap 15100 with a built-in oscillating dissector, where the oscillating system 15124 may comprise a gear assembly 15126 rotatably connected to the arm 15104 such that rotation of the gear assembly 15126 in the first plane 15130 may cause the arm 15104 to perform the first predetermined movement (e.g., an oscillating movement along a predetermined arc length) in the first plane 15130 at a predetermined frequency, as discussed in greater detail above. The gear assembly 15126 may be located in the housing 15102 of the endoscopic resection cap 15100 and powered by a drive system (e.g., any suitable type of motors) at the user end. In this embodiment, the arm 15104 may have a gear configuration and the gear teeth of the arm 15104 may serve as the dissecting surfaces 15210.

Figure 17:
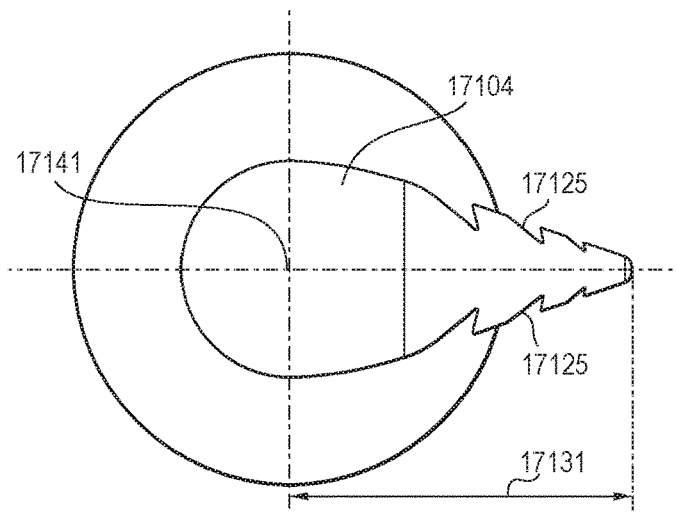
FIG. 17 is an illustration showing a front view of a first embodiment of an oscillating dissector configured to be incorporated into an endoscopic resection cap in accordance with certain aspects of the present disclosure.
Figure 18:
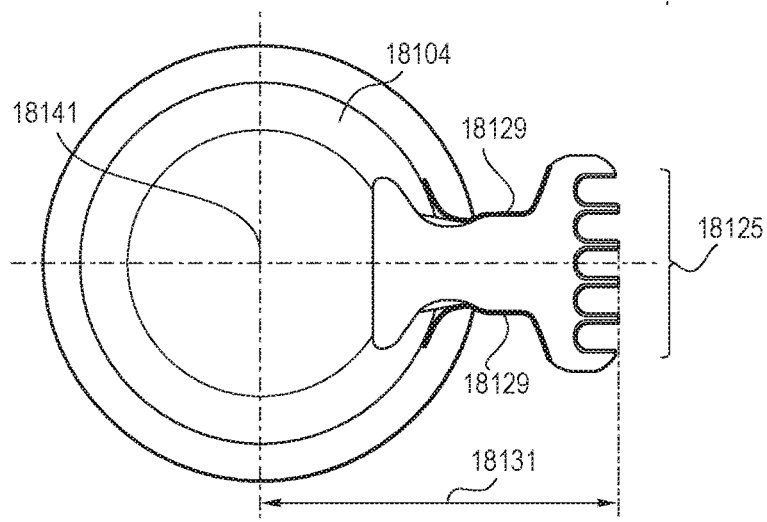
FIG. 18 is an illustration showing a front view of a second embodiment of an oscillating dissector configured to be incorporated into an endoscopic resection cap in accordance with certain aspects of the present disclosure.
Figure 19:
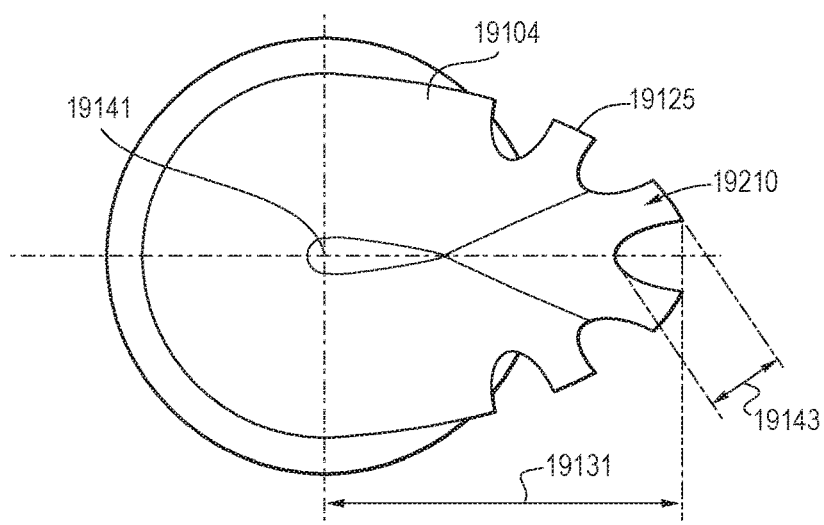
FIG. 19 is an illustration showing a front view of a third embodiment of an oscillating dissector configured to be incorporated into an endoscopic resection cap in accordance with certain aspects of the present disclosure.

FIGS. 17-19 show three embodiments of the arm that can be incorporated into an endoscopic resection cap for the same or different cutting purposes. As shown in FIG. 17, the arm 17104 may have a pointed cutting surface 17125. The cutting surface 17125 may have reverse cutouts/barbs to facilitate grabbing tissue such that the arm 17104 may be more efficient at breaking fibers and shortens the procedure time. As shown in FIG. 18, the arm 18104 may have a T-shaped configuration with a relatively flat cutting surface 18125 and two relatively flat edges 18129. The T-shaped configuration may provide the ability to hook tissue. The two relatively flat edges 18129 may include cauterizing surfaces (e.g., electrodes) configured for cauterizing vessels or fibrotic tissue that cannot be dissected by the relatively flat cutting surface 18125. As shown in FIG. 19, the arm 19104 may include a curved cutting surface 19125 having one or more teeth 19210 disposed between a plurality of U-shaped cutouts. Due to the position of the cutouts, the embodiments shown in FIGS. 17 and 19 may dissect tissue both moving forward (distally) and sideways (laterally relative to a distal-proximal axis of those embodiments), while the embodiment shown in FIG. 18 may dissect tissue moving forward (distally). Additionally or alternatively, in some embodiments, the cutting surface 19125 may be a rough surface with uneven features that may perform the blunt dissection of tissue during oscillation. It will be appreciated that any embodiment of the arm and any variation or combination of the embodiments of the arm described above, together with a corresponding oscillating system, may be incorporated into an endoscopic resection cap to perform a predetermined oscillating movement at a predetermined frequency.

It will be appreciated that the radius of the rotation of the arm and the tooth height of the arm may be varied, as desired and/or needed, without departing from the scope of the present invention, to achieve a desired arc length of the rotation. For example, as shown in FIGS. 17-19, the arm (17104, 18104, 19104) may be rotatable around an axis (17141, 18141, 19141) with a radius (17131, 18131, 19131) ranging between about 2.5 mm and about 10 mm. In the embodiment shown in FIG. 19, the one or more teeth 19210 may have a tooth height 19143 ranging between about 0.1 mm and about 2 mm, and the arc length of the rotation of the arm 19104 may be between about 0.5 mm and about 7.0 mm per oscillation, and may be up to 30 mm.

Figure 23:
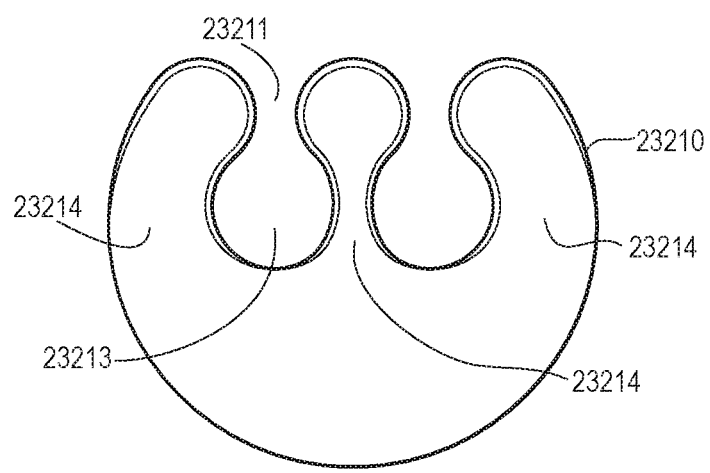
FIG. 23 is an illustration showing a diagrammatic view of a first embodiment of the teeth of the arm configured to be incorporated into an endoscopic resection cap in accordance with certain aspects of the present disclosure.
Figure 24:
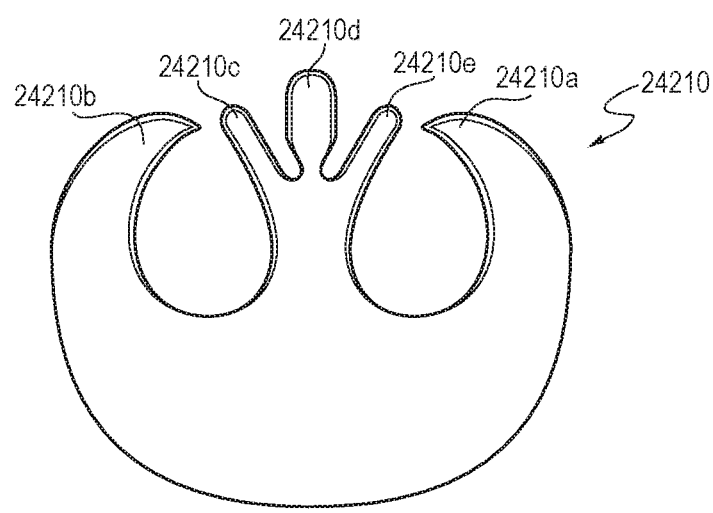
FIG. 24 is an illustration showing a diagrammatic view of a second embodiment of the teeth of the arm configured to be incorporated into an endoscopic resection cap in accordance with certain aspects of the present disclosure.
Figure 25:
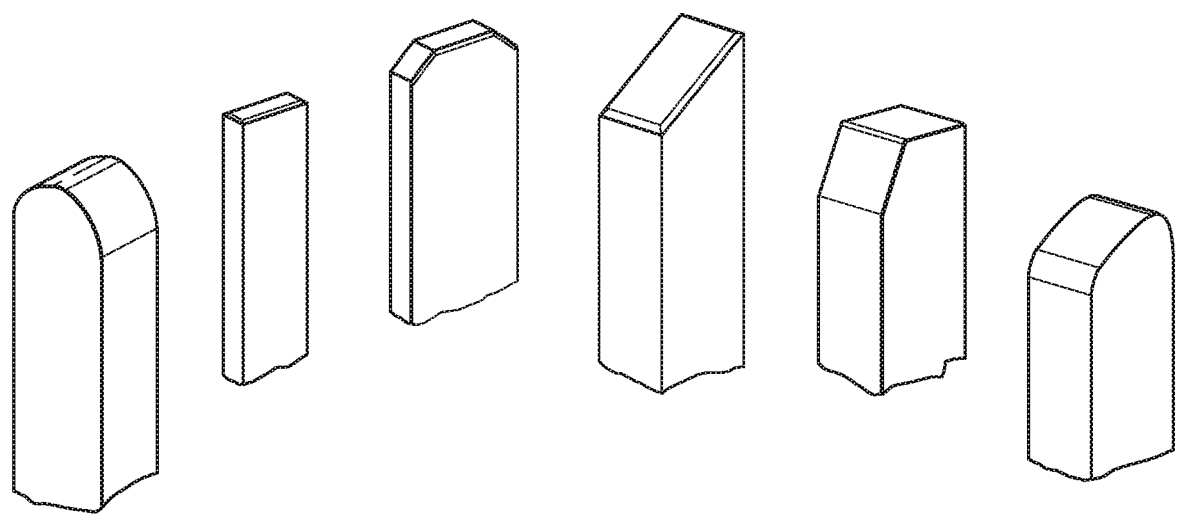
FIG. 25 is an illustration showing diagrammatic side views of the arm configured to be incorporated into an endoscopic resection cap in accordance with certain aspects of the present disclosure.

It will be appreciated that the teeth of the arm may have various configurations without departing from the scope of the present invention. As shown in FIG. 23, for example, the teeth 23210 may have a geometry where entrance opening(s) 23211 into the teeth may have a smaller diameter than bottom region(s) 23213 between the bases 23214 of the teeth so that each tooth helps capture and tear the target tissue. As for another example, as shown in FIG. 24, the teeth 24210 may have projections of different heights to capture multiple tissue densities, where the larger teeth (e.g., 24210a and 24210b) may capture looser tissue and the smaller teeth (e.g., 24210c-24210e) may capture somewhat denser tissue but not the more dense, healthy underlying tissue of the muscularis propria. In some embodiments, as shown in FIG. 25, the edges of the teeth 25210 may be chamfered, asymmetrical circular, triangular, asymmetrical trapezoid, or any suitable configuration as desired and/or needed. In each of these tooth/teeth configurations, it is preferable that each will only cut and/or tear soft target tissue (e.g., intestinal mucosal and submucosal tissue, especially if diseased) but not underlying or otherwise adjacent healthy tissue (e.g., healthy blood vessels, muscle tissue).

Figure 20:
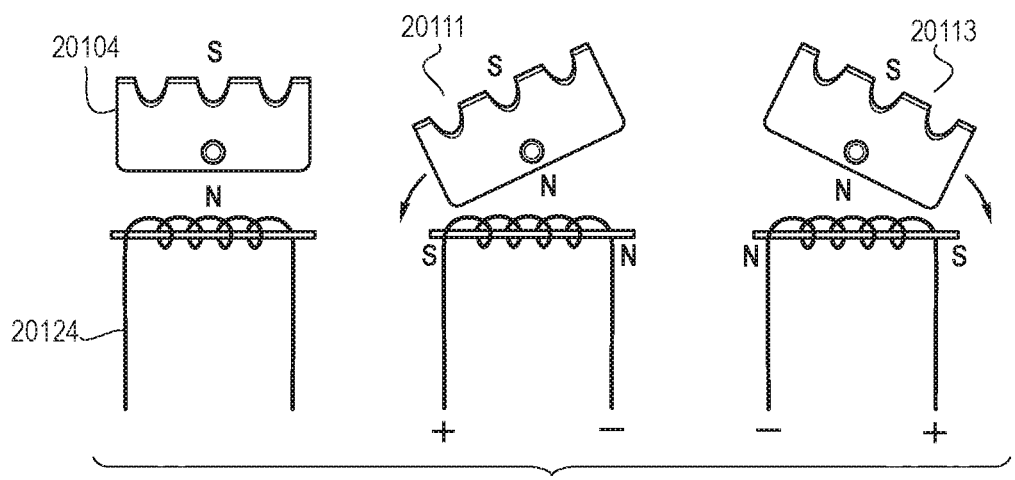
FIG. 20 is an illustration showing a diagrammatic view of a fourth embodiment of an oscillating dissector configured to be incorporated into an endoscopic resection cap in accordance with certain aspects of the present disclosure.

Other embodiments of the arm and the corresponding oscillating system may be contemplated to perform the blunt dissection of tissue. In some embodiments, as shown in FIG. 20, the arm 20104 may be a permanent magnet or directly attached to a permanent magnet. An adjacent inductor 20124 (e.g., coil wrapped around a ferromagnetic material) with alternating current may cause the arm 20104 to oscillate between a first state 20111 and a second state 20113. The power source and circuitry for the inductor 20124 may be located at the user end. This embodiment provides the ability to incorporate the arm as part of the oscillating system, thus eliminating coupling mechanical components (e.g., gears, levers) that would otherwise be necessary if a separate distinct oscillating system was used.

Figure 21:
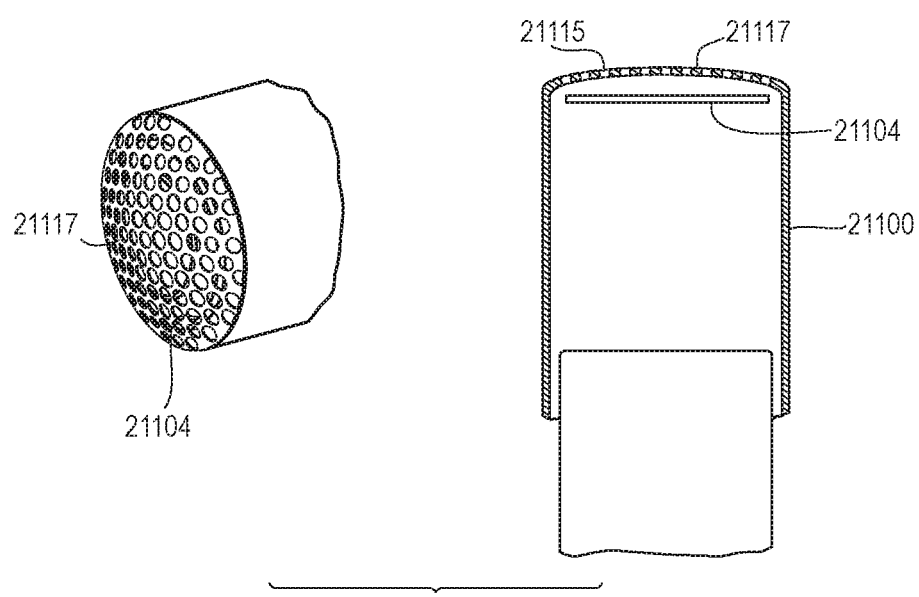
FIG. 21 is an illustration showing perspective and cross-sectional side views of a fifth embodiment of an oscillating (and/or rotating) dissector configured to be incorporated into an endoscopic resection cap in accordance with certain aspects of the present disclosure.

In some embodiments, as shown in FIG. 21, the endoscopic resection cap 21100 may include an arm 21104 (e.g., having a spinning blade configuration) behind the distal end 21117 of the cap. The distal end 21117 of the cap may include a plurality of holes 21115 such that connective tissue can be suctioned through the holes 21115 and the arm 21104 may spin faster than the naked eye thus not impairing visibility. This embodiment may provide the ability to perform the blunt dissection by quickly dissecting submucosal fibers safely while sparing blood vessels by preventing vessels from entering through the holes 21115.

Figure 22:
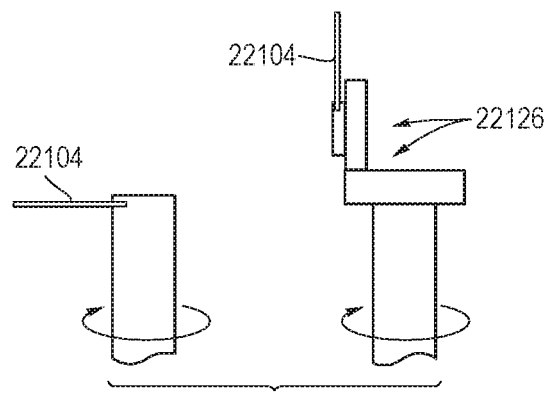
FIG. 22 is an illustration showing a diagrammatic view of a sixth embodiment of a rotating (and/or oscillating) dissector configured to be incorporated into an endoscopic resection cap in accordance with certain aspects of the present disclosure.

In some embodiments, the arm may include two arm components in parallel, where one arm component is fixed and the other oscillates relative to the fixed arm component so that a shearing action may occur when the dynamic arm component is activated, which will readily be understood with reference to the present drawings and embodiments (e.g., where one of skill in the art will easily envision and comprehend placement of single-tooth or multi-tooth arms for such embodiments, operating similar to powered hair-clippers). In some embodiments, the arm may include a polymer or metal wire, string, monofilament, braided construct, or the like, which may be attached to a rotary mechanism such that the modulus is tuned to overcome the viscoelasticity of the connective tissue without disrupting tissue found in the muscularis and arteries, operating similarly to a polymer-corded weed-trimmer. This embodiment would allow the arm to perform the blunt dissection without requiring the mechanisms for an oscillating motion. As shown in FIG. 22, for example, the dissector may be a permutation of the cap design with the arm 22104 rotating and/or oscillating either perpendicular to the axis of rotation (left side of FIG. 22) or parallel to the axis of rotation via a cam assembly 22126 (right side of FIG. 22). In some embodiments, the dissector may include or even be composed of a torque cable/tube through a catheter with the arm attached to the distal end of the torque cable/tube.

One general aspect includes the medical device where the housing further includes a longitudinal lumen configured to receive and direct an endoscopic grasping tool, and where the engagement around an outer circumferential surface of an endoscope is provided by a second cavity configured to receive an endoscope therein through a friction fit.

Implementations may include one or more of the following features. The medical device where the first predetermined movement includes an oscillating movement of the distal end portion of the arm, where the oscillating movement has an arc length between about 0.5 mm and about 7.0 mm (and may be up to 30 mm), and where the predetermined frequency is between about 25 Hz and about 200 Hz. The medical device where the arm is curved along a longitudinal axis of the arm. The medical device where the arm includes an elongate aperture reciprocatingly movable relative to a pin attached to the housing. The medical device where the oscillating system includes pull wires, each extending between a respective proximal end and distal end of each pull wire, and where the distal ends of the pull wires are attached to the arm such that manipulation of the proximal ends of the pull wires causes the arm to perform the first predetermined movement. The medical device where the oscillating system includes a cam assembly having a cam track groove configured for receiving therein at least a portion of a guide portion of the arm, and where the guide portion of the arm moves along at least a portion of the cam track groove in response to rotation of the cam assembly such that the arm performs the first predetermined movement. The medical device further including a connecting guide extending between a distal end and a proximal end, where the distal end of the connecting guide is connected to the arm, where the oscillating system includes a cam assembly having a cam surface configured to engage with the proximal end of the connecting guide, and where the proximal end of the connecting guide moves along at least a portion of the cam surface in response to rotation of the cam assembly such that the arm performs the first predetermined movement. The medical device where the oscillating system includes a gear assembly rotatably connected to the arm such that rotation of the gear assembly causes the arm to perform the first predetermined movement. The medical device where the oscillating system includes an inductor with alternating current configured to cause the arm to perform the first predetermined movement.

One general aspect includes a medical device for facilitating a minimally invasive surgical procedure, including: a housing including a first cavity; an arm including at least one tissue-dissecting surface and rotatably received within the first cavity, the arm including a first receiving slot and a second receiving slot; a first connecting member extending between a first distal end and a first proximal end of the first connecting member; and a second connecting member extending between a second distal end and a second proximal end of the second connecting member, where the first distal end of the first connecting member is slidably received within the first receiving slot, and the second distal end of the second connecting member is slidably received within the second receiving slot, and configured where manipulation of the first and second proximal ends causes the arm to rotate through at least an arc with respect to the housing. Other embodiments of this aspect include corresponding computer systems, apparatus, and computer programs recorded on one or more computer storage devices, each configured to perform the actions of the methods.

Implementations may include one or more of the following features. The medical device further including an oscillating system, where the oscillating system includes a guide member extending between a first end portion and a second end portion, where the first proximal end of the first connecting member is connected to the first end portion and the second proximal end of the second connecting member is connected to the second end portion, and configured where motion of the guide member causes the first and second connecting members to move such that the arm rotates with respect to the housing. The medical device where the guide member is rotatable in a first plane in a clockwise direction and in a counter-clockwise direction, where when the guide member rotates in the clockwise direction in the first plane, it causes one of the first and second connecting members to be pulled such that the arm rotates in the clockwise direction, and where when the guide member rotates in the counter-clockwise direction in the first plane, it causes another one of the first and second connecting members to be pulled such that the arm rotates in the counter-clockwise direction in the first plane. The medical device where the guide member is connected to a drive system such that the guide member is rotatable out of the first plane. The medical device where the arm is rotatably and pivotally connected to a third portion of the housing, where the guide member is configured such that manipulation of the guide member causes one or two of the first and second connecting members to move such that the arm pivots into a second plane at an angle relative to the first plane, and where rotation of the guide member causes the arm to rotate in the second plane. The medical device where the first and second connecting members are pull wires. The medical device where the manipulation of the first and second proximal ends causes the arm to rotate with respect to the housing along an arc length between about 0.5 mm and about 30 mm and at a frequency between about 25 Hz and about 200 Hz. The medical device where the arm has one or more surfaces that are in a tooth configuration. The medical device where the housing further includes a second cavity, and where the second cavity is configured to receive an endoscope therein through a friction fit.

One general aspect includes a medical device for facilitating a minimally invasive surgical procedure, including: a housing including a first cavity and a second cavity; an arm rotatably received within the first cavity, the arm including a guide portion and a connecting portion; and a cam assembly rotatably received within the second cavity, the cam assembly including a cam track groove configured to slidably receive therein at least a portion of the guide portion, where the arm is rotatably connected to a third portion of the housing through the connecting portion, and where rotation of the cam assembly causes the guide portion to slide along a predetermined track within the cam track groove such that the arm is urged to rotate in a first plane.

Implementations may include one or more of the following features. The medical device where the cam track groove is configured such that the rotation of the cam assembly causes the guide portion to move up and down, which urges the arm to rotate in the first plane. The medical device where when the cam assembly rotates and causes the guide portion to move up, the arm is urged to rotate counter-clockwise in the first plane, and where when the cam assembly rotates and causes the guide portion to move down, the arm is urged to rotate clockwise in the first plane. The medical device where rotation of the cam assembly around a first axis causes the arm to rotate around a second axis, and where the first axis is generally perpendicular to the second axis. The medical device where the cam assembly includes an upper portion, a lower portion, and an intermediate portion disposed between the upper portion and the lower portion, where the upper portion has a first top surface and a first bottom surface, and the first bottom surface is angled toward the first top surface, where the lower portion has a second top surface and a second bottom surface, and the second top surface angled away from the second bottom surface, and where the first bottom surface, the second top surface, and an outer surface of the intermediate portion are configured such that the rotation of the cam assembly causes the arm to perform a predetermined oscillating movement in the first plane. The medical device where the upper portion, the lower portion, and the intermediate portion are substantially in a cylindrical configuration. The medical device where the arm has one or more surfaces that are in a tooth configuration. The medical device where the cam assembly is a barrel cam. The medical device where the cam assembly is connected to a drive system such that it is rotatable around a first axis. The medical device where the third portion of the housing is configured to move upwardly with respect to a lower portion of the housing. The medical device where the rotation of the cam assembly causes the arm to rotate in the first plane along an arc length between about 0.5 mm and about 30 mm and at a frequency between about 25 Hz and about 200 Hz.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims, including expressly that different illustrated arm and tooth configurations may be interchangeable between the embodiments, and that each embodiment of the resection cap may be configured as an accessory for removable attachment to an endoscope or may be included as an integral part of an endoscope. Moreover, the advantages described herein are not necessarily the only advantages of the present disclosure and it is not necessarily expected that every embodiment of the present disclosure will achieve all of the advantages described.

We claim:

1. A medical device for facilitating a minimally invasive surgical procedure, comprising:
    a housing
        configured for engagement around an outer circumferential surface of an endoscope and
        comprising a first cavity; and
    an arm, including at least one tissue-dissecting surface configured for blunt tissue disruption rather than sharp-cutting incision of the type associated with a knife blade, said arm movably received within the first cavity, wherein a distal end portion of the arm is configured to perform a first predetermined movement along at least a first plane at a predetermined frequency, corresponding to reciprocating movement of a proximal portion of the arm,
    wherein the arm includes a non-circular aperture configured to reciprocate back and forth across a pin securing the arm into the first cavity,
    wherein the pin is fixed to the housing,
    wherein the arm has a rotational movement and also a translational movement, and
    wherein the pin is disposed in the non-circular aperture to allow for each of the rotational and translational movements of the arm relative to the pin, such that the arm is configured to move across the pin according to the multiple allowed movements.

2. The medical device of claim 1,
    wherein the housing further comprises a longitudinal lumen configured to receive and direct an endoscopic grasping tool, and
    wherein the engagement around the outer circumferential surface of the endoscope is provided by a second cavity configured to receive the endoscope therein through a friction fit or other releasable/removable attachment means that secures the housing releasably to the endoscope for use as an endoscope accessory tool.

3. The medical device of claim 1,
    wherein the first predetermined movement includes an oscillating movement of the distal end portion of the arm, wherein the oscillating movement has an arc length between about 0.5 mm and 30 mm, and wherein the predetermined frequency is between about 25 Hz and about 200 Hz.

4. The medical device of claim 1,
    wherein the arm is curved at a distal end region of the arm in a direction away from the housing.

5. The medical device of claim 1, comprising
    pull wires, each extending between a respective proximal end and distal end of each pull wire, and
    wherein the distal ends of the pull wires are attached to the arm such that manipulation of the proximal ends of the pull wires causes the arm to perform the first predetermined movement.

6. The medical device of claim 1,
    further comprising a steerable endoscope shaft with controls, and at least one visualization element, where the medical device either is constructed as integrated with the steerable endoscope shaft or is configured to be removably attached to the endoscope shaft for use as an endoscope accessory tool.

7. A medical device for facilitating a minimally invasive surgical procedure, comprising:
    a housing comprising a first cavity;
    an arm including at least one blunt tissue-dissecting surface and rotatably received within the first cavity, the arm comprising a first receiving slot and a second receiving slot;
    a first connecting member extending between a first distal end and a first proximal end of the first connecting member; and
    a second connecting member extending between a second distal end and a second proximal end of the second connecting member,
    wherein the first distal end of the first connecting member is slidably received within the first receiving slot, and the second distal end of the second connecting member is slidably received within the second receiving slot, and
    configured wherein manipulation of the first and second proximal ends causes the arm to rotate through at least an arc with respect to the housing,
    wherein manipulating the first connecting member rotates the arm in a first direction,
    wherein manipulating the second connecting member rotates the arm in a second direction,
    wherein the arm includes a non-circular aperture configured to reciprocate back and forth across a pin securing the arm into the first cavity,
    wherein the pin is fixed to the housing,
    wherein, in addition to the rotation in the first and second directions, the arm also includes a translational movement, and
    wherein the pin is disposed in the non-circular aperture to allow for each of the rotational and translational movements of the arm relative to the pin, such that the arm is configured to move across the pin according to the multiple allowed movements.

8. The medical device of claim 7, further comprising an oscillating system,
    wherein the oscillating system comprises a guide member extending between a first end portion and a second end portion,
    wherein the first proximal end of the first connecting member is connected to the first end portion and the second proximal end of the second connecting member is connected to the second end portion, and
    configured wherein motion of the guide member causes the first and second connecting members to move such that the arm rotates with respect to the housing.

9. The medical device of claim 8,
    wherein the guide member is rotatable in a first plane in a clockwise direction and in a counter-clockwise direction,
    wherein when the guide member rotates in the clockwise direction in the first plane, it causes one of the first and second connecting members to be pulled such that the arm rotates in the clockwise direction, and
    wherein when the guide member rotates in the counter-clockwise direction in the first plane, it causes another one of the first and second connecting members to be pulled such that the arm rotates in the counter-clockwise direction in the first plane.

10. The medical device of claim 9, wherein the guide member is connected to a drive system such that the guide member is rotatable out of the first plane.

11. The medical device of claim 9,
wherein the arm is rotatably and pivotally connected to a third portion of the housing,
wherein the guide member is configured such that manipulation of the guide member causes one or two of the first and second connecting members to move such that the arm pivots into a second plane at an angle relative to the first plane, and
wherein rotation of the guide member causes the arm to rotate in the second plane.

12. The medical device of claim 7, wherein the first and second connecting members are pull wires.

13. The medical device of claim 7, wherein the manipulation of the first and second proximal ends causes the arm to rotate with respect to the housing along an arc length between about 0.5 mm and 30 mm and at a frequency between about 25 Hz and about 200 Hz.

14. The medical device of claim 7, wherein the arm has one or more surfaces that are in a tooth configuration.

15. The medical device of claim 7,
wherein the housing further comprises a second cavity, and
wherein the second cavity is configured to receive an endoscope therein through a friction fit or other releasable/removable attachment means that secures the housing releasably to the endoscope for use as the endoscope accessory tool.

16. The medical device of claim 7, wherein the first connecting member and the second connecting member are disposed on opposite sides of the arm.

17. An endoscope comprising:
an integrated distal tool end, or a removable tool end, configured for facilitating a minimally invasive surgical procedure, said tool end comprising:
a housing comprising a first cavity; and
an arm, including at least one tissue-dissecting surface, said arm movably received within the first cavity, wherein a distal end portion of the arm is configured to perform a first predetermined movement along at least a first plane at a predetermined frequency, corresponding to reciprocating movement of a proximal portion of the arm, wherein the arm is curved along a central proximal-distal longitudinal axis of the arm, and the arm includes a non-circular aperture configured to reciprocate back and forth across a pin securing the arm into the first cavity,
wherein the pin is fixed to the housing,
wherein the arm has a rotational movement and also a translational movement, and
wherein the pin is disposed in the non-circular aperture to allow for each of the rotational and translational movements of the arm relative to the pin, such that the arm is configured to move across the pin according to the multiple allowed movements.

18. The endoscope of claim 17, wherein the arm is curved at a distal end region of the arm in a direction away from the housing.

19. The endoscope of claim 17, further comprising first and second connecting members coupled to the arm, wherein manipulating the first connecting member rotates the arm in a first direction, and wherein manipulating the second connecting member rotates the arm in a second direction.

* * * * *